United States Patent
Ihara

(10) Patent No.: US 9,948,940 B2
(45) Date of Patent: Apr. 17, 2018

(54) ENCODING APPARATUS, DECODING APPARATUS, ENCODING METHOD, AND DECODING METHOD

(71) Applicant: FUJITSU LIMITED, Kawasaki-shi, Kanagawa (JP)

(72) Inventor: Noriyuki Ihara, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 242 days.

(21) Appl. No.: 14/242,426

(22) Filed: Apr. 1, 2014

(65) Prior Publication Data

US 2014/0307805 A1    Oct. 16, 2014

(30) Foreign Application Priority Data

Apr. 10, 2013    (JP) .................................. 2013-082332

(51) Int. Cl.
H04N 19/70    (2014.01)
H04N 19/42    (2014.01)
(Continued)

(52) U.S. Cl.
CPC .............. *H04N 19/42* (2014.11); *H04N 19/46* (2014.11); *H04N 21/4307* (2013.01);
(Continued)

(58) Field of Classification Search
CPC ...... H04N 19/176; H04N 19/44; H04N 19/61; H04N 19/124; H04N 19/30; H04N 19/70; H04N 19/46; H04N 19/597
See application file for complete search history.

(56) References Cited

U.S. PATENT DOCUMENTS 5,809,176 A * 9/1998 Yajima ................ H03M 7/4006
                                                          375/E7.026
6,870,883 B2 * 3/2005 Iwata ..................... H04N 19/61
                                                             375/240.01
(Continued)

FOREIGN PATENT DOCUMENTS

JP          8-79701       3/1996
JP          10-234043     9/1998
(Continued)

OTHER PUBLICATIONS

International Search Report dated Jun. 19, 2012 for corresponding International Application No. PCT/JP2012/056946 (continuation to U.S. Appl. No. 14/456,742), 3 pages.
(Continued)

*Primary Examiner* — Mohammed Rahaman
*Assistant Examiner* — Kehinde O Abimbola
(74) *Attorney, Agent, or Firm* — Fujitsu Patent Center

(57) ABSTRACT

The plurality of encoders respectively transmit encoded information including an encoded image obtained by encoding one image among the plurality of images obtained by partitioning a captured image, and time information corresponding to the one image. At least any one of the plurality of encoders transmits identification information for respectively identifying the plurality of images. A decoding apparatus includes a plurality of decoders. One decoder calculates a playback time for each of a plurality of images based on a scheduled playback time at which a real time according to a scheduled playback time of the plurality of images, which is calculated by each decoder, is later than a real time according to a scheduled playback time of the other images. Encoding with which synchronized partitioned video images can be transmitted in real time in a cost-effective IP network (Continued)

without needing devices such as a conversion device can be performed.

14 Claims, 28 Drawing Sheets

(51) Int. Cl.
H04N 19/46 (2014.01)
H04N 21/43 (2011.01)
H04N 21/462 (2011.01)
H04N 21/858 (2011.01)

(52) U.S. Cl.
CPC ..... *H04N 21/4622* (2013.01); *H04N 21/8586* (2013.01); *H04N 19/439* (2014.11)

(56) References Cited

U.S. PATENT DOCUMENTS

| | | | | |
|---|---|---|---|---|
| 9,591,283 | B2* | 3/2017 | Ihara | H04N 21/242 |
| 2002/0031184 | A1* | 3/2002 | Iwata | H04N 19/61 |
| | | | | 375/240.23 |
| 2005/0053131 | A1* | 3/2005 | Domke | H04N 19/436 |
| | | | | 375/240.01 |
| 2005/0147174 | A1* | 7/2005 | Iwata | H04N 19/61 |
| | | | | 375/240.23 |
| 2006/0033840 | A1 | 2/2006 | Diehl et al. | |
| 2006/0171600 | A1* | 8/2006 | Kikuchi | G11B 27/005 |
| | | | | 382/232 |
| 2007/0104277 | A1* | 5/2007 | Kikuchi | G11B 27/005 |
| | | | | 375/240.18 |
| 2007/0104455 | A1* | 5/2007 | Kikuchi | G11B 27/005 |
| | | | | 386/240 |
| 2008/0152020 | A1 | 6/2008 | Kayashima et al. | |
| 2010/0220792 | A1 | 9/2010 | Kamito et al. | |
| 2011/0013849 | A1* | 1/2011 | Saito | H04N 19/61 |
| | | | | 382/233 |
| 2011/0216819 | A1* | 9/2011 | Guyot | H04N 21/2221 |
| | | | | 375/240.02 |
| 2013/0268980 | A1* | 10/2013 | Russell | H04N 21/4122 |
| | | | | 725/75 |
| 2014/0348248 | A1* | 11/2014 | Ihara | H04N 21/242 |
| | | | | 375/240.26 |
| 2015/0179227 | A1* | 6/2015 | Russell | H04N 21/4122 |
| | | | | 386/201 |

FOREIGN PATENT DOCUMENTS

| | | |
|---|---|---|
| JP | 11-239347 | 8/1999 |
| JP | 2002-125203 A | 4/2002 |
| JP | 2008-166862 | 7/2008 |
| JP | 2010-278983 A | 12/2010 |
| JP | 2010-279082 A | 12/2010 |
| WO | 2009/063554 A1 | 5/2009 |

OTHER PUBLICATIONS

Japanese Office Action dated Dec. 6, 2016, for corresponding Japanese Patent Application No. 2013-082332, with Partial English Translation, 11 pages.

U.S. Notice of Allowance and Fees Due dated Dec. 6, 2016 for co-pending U.S. Appl. No. 14/456,742, 16 pages.

* cited by examiner

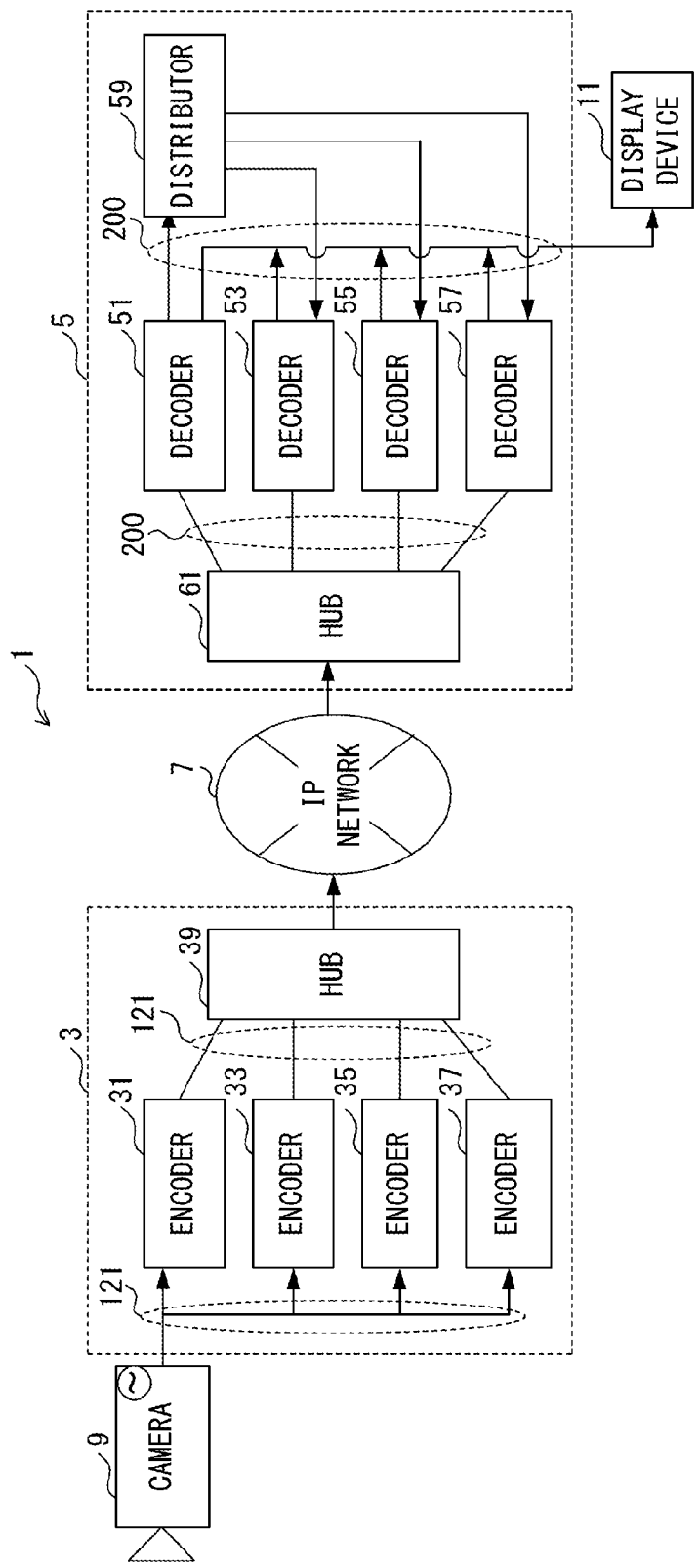
F I G. 1

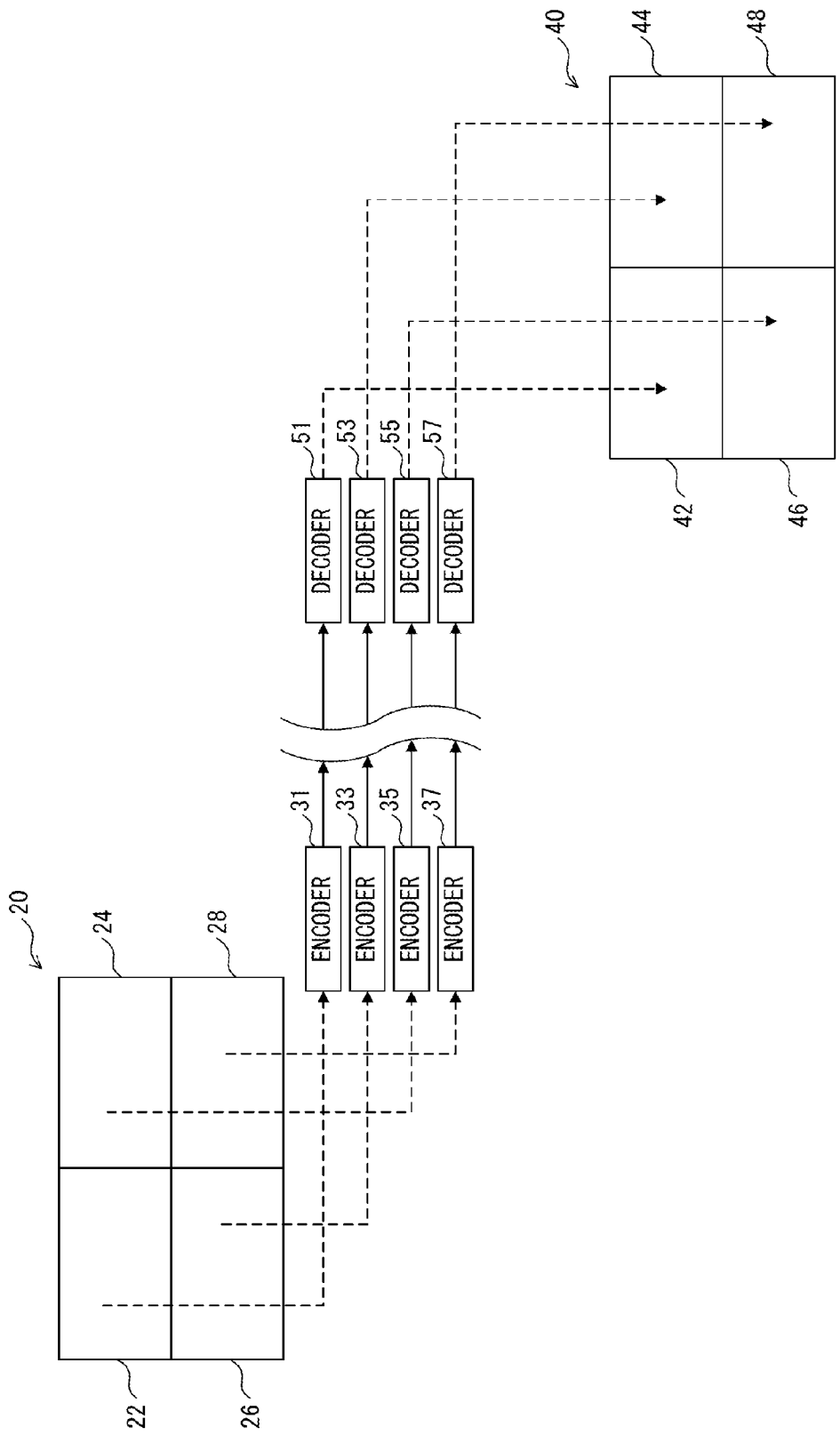
F I G. 2

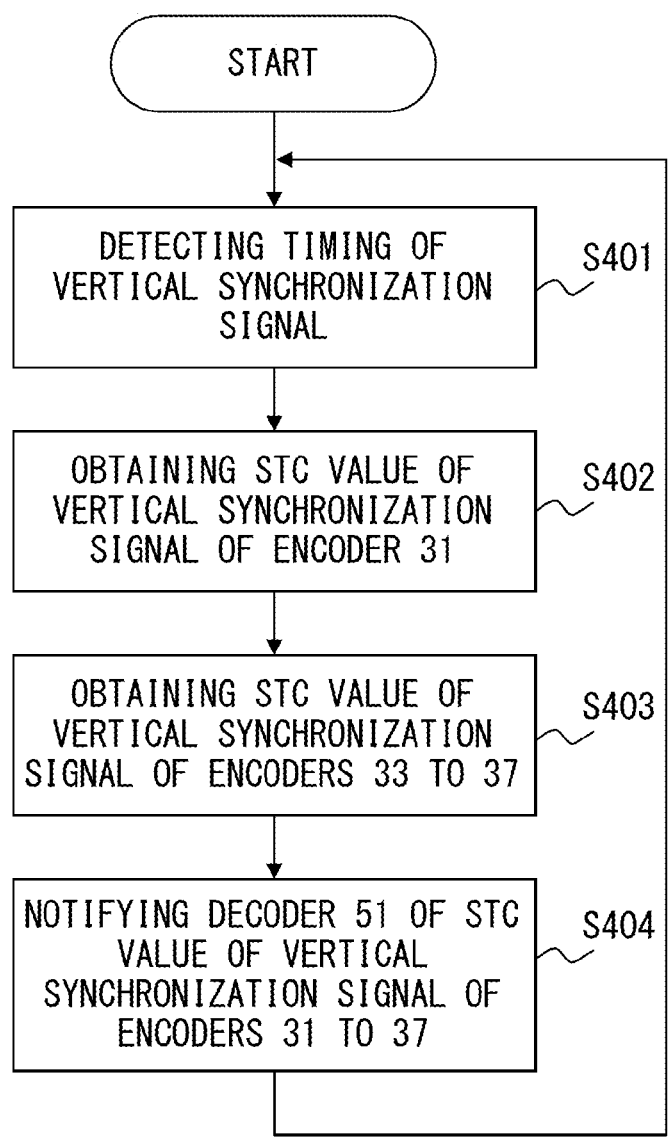
F I G. 1 2

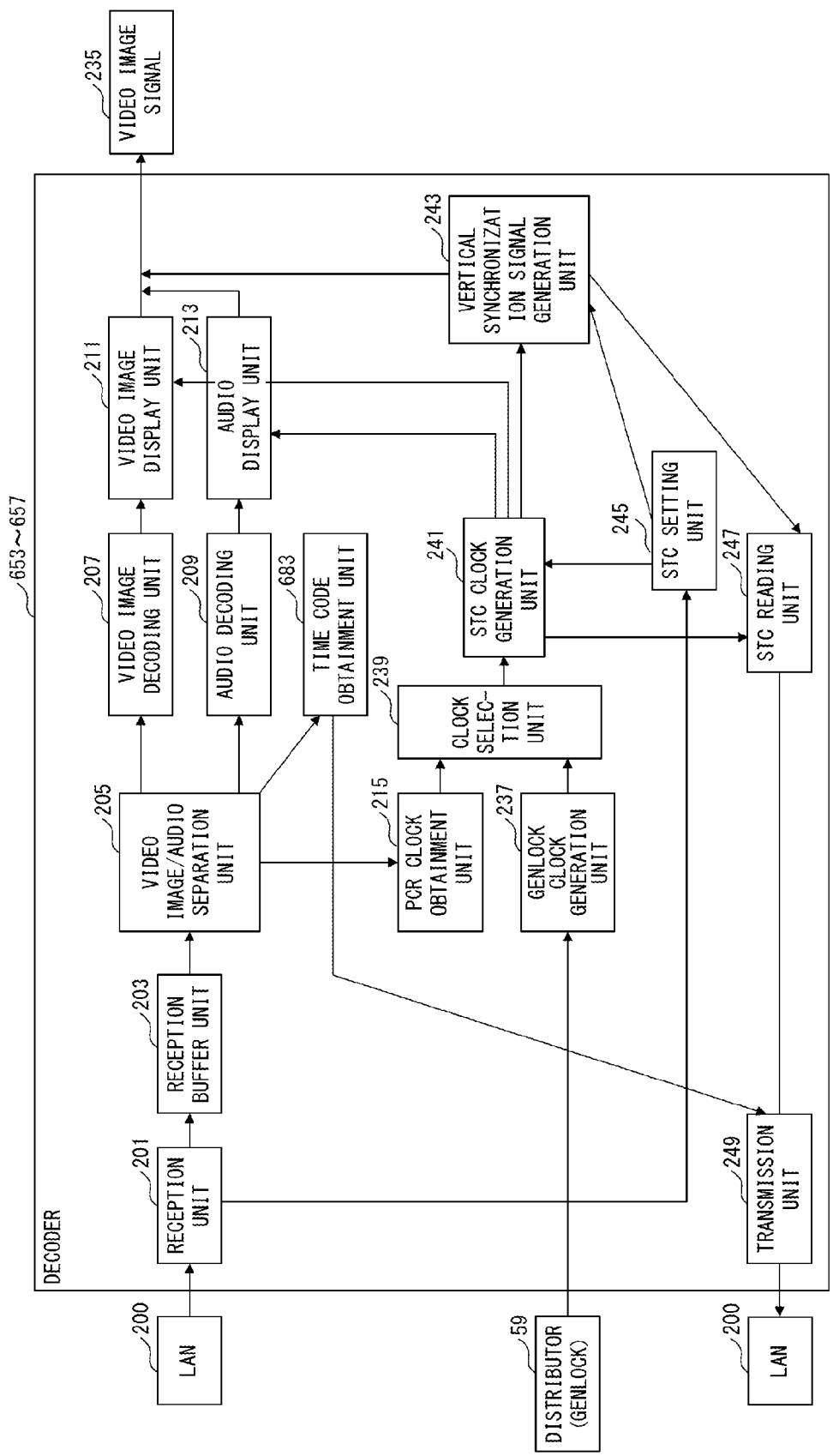
F I G. 21

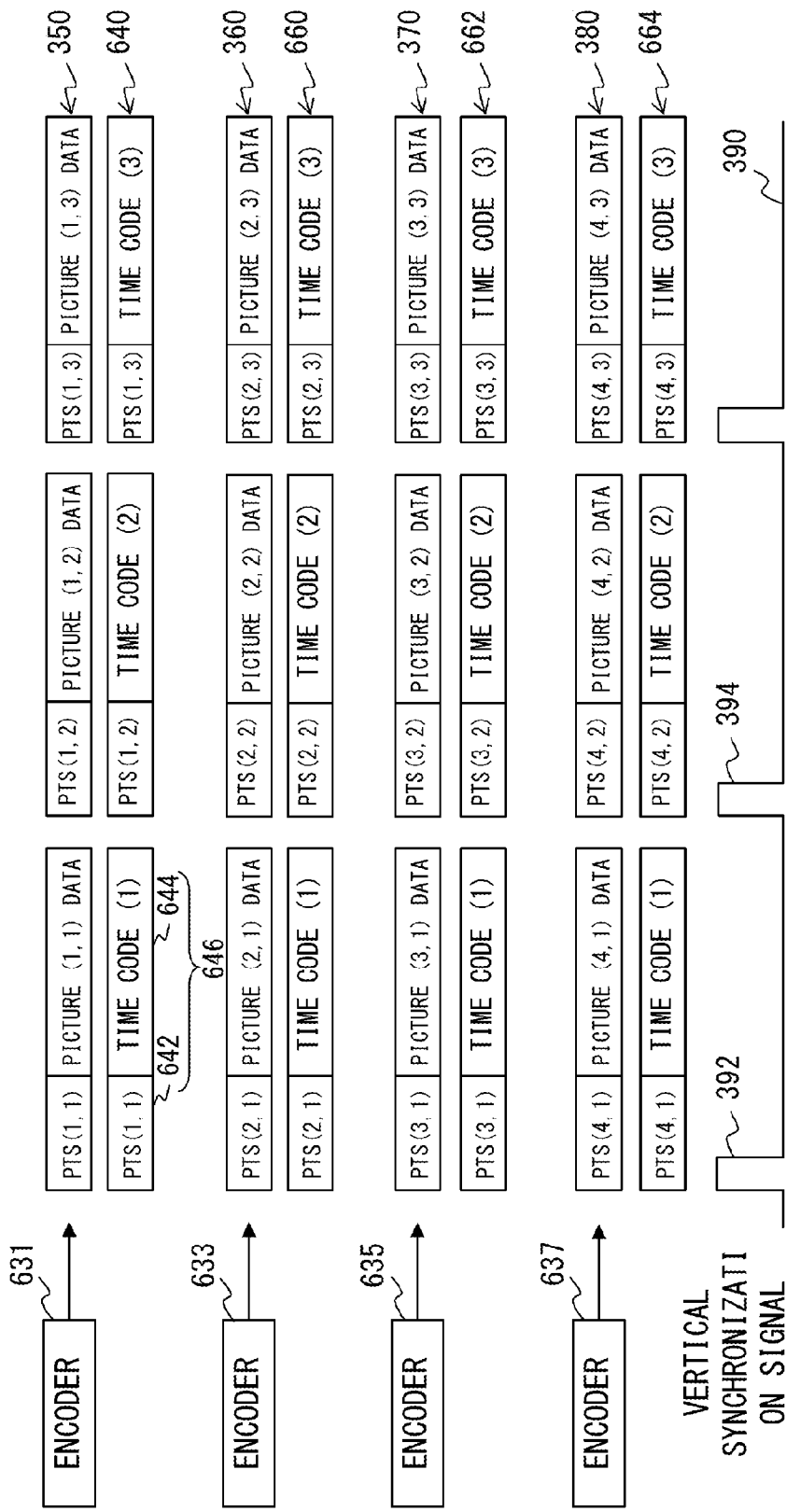
F I G. 22

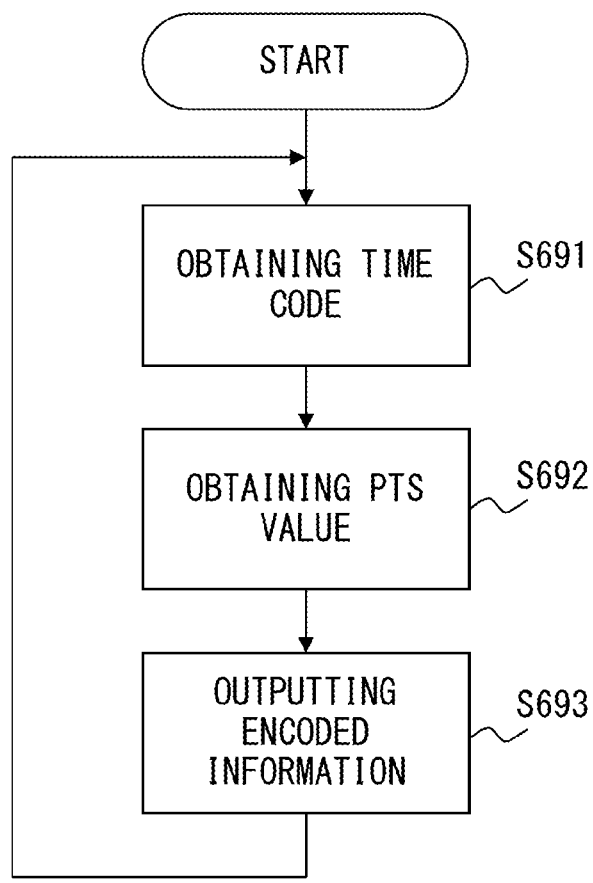
F I G. 2 3

ENCODING APPARATUS, DECODING APPARATUS, ENCODING METHOD, AND DECODING METHOD

CROSS-REFERENCE TO RELATED APPLICATION

This application is based upon and claims the benefit of priority of the prior Japanese Patent Application No. 2013-082332, filed on Apr. 10, 2013, the entire contents of which are incorporated herein by reference.

FIELD

The embodiments discussed herein are related to an encoding apparatus, a decoding apparatus, an encoding method, a decoding method, and a program.

BACKGROUND

Currently, there are few codecs that can compress and transmit, for example, a video image of 4K2K size (hi-vision (registered trademark): a quadruple of a resolution of 1920× 1080) or a super hi-vision size (16 times of hi-vision) used in digital cinemas, and their costs are high. Accordingly, there is the demand for partitioning a video image into four or 16 images and transmitting the video images by using a plurality of cost-effective hi-vision codecs when a video image of 4K2K size or super hi-vision size (hereinafter referred to as a super hi-vision video image) is transmitted. There is also the demand for implementing a transmission of such a super hi-vision video image by using an Internet Protocol (IP) network that needs less line cost. Moreover, there is the demand for respectively transmitting right and left video images of a 3 Definition (3D) video image with hi-vision as a similar transmission of partitioned images.

When partitioned video images are transmitted by using a plurality of devices, decoders need to synchronize and play back received frames to be play backed of video images of encoders. However, when operations are simply performed such that a video image is partitioned, and partitioned video images and audio are compressed by a plurality of encoders and transmitted in an IP network, and the output video images are synthesized by decoders, the outputs of the partitioned video images of the decoders cannot be synchronized at the same timing. This is because encoding and decoding delays of the encoders and the decoders, and a transmission delay of the network are different. Accordingly, a technique for equalizing delays caused by transmissions between all encoders and decoders by multiplexing and transmitting data corresponding to partitioned video images output from the encoders into one stream, and by demultiplexing the stream on a receiving side is known (for example, see Patent Documents 1 to 3).

As another technique, an encoding/decoding system including, for example, an encoding system configured with a plurality of encoding devices, and a decoding system including a plurality of decoding devices that display image data of one screen by decoding the image data transmitted from the encoding system is known. In such an encoding/decoding system, the encoding system encodes, from the image data of one screen, a plurality of pieces of partitioned image data, the number of which is equal to that of the encoding devices, with the plurality of encoding devices, and transmits the partitioned data to the decoding system. The plurality of encoding devices respectively calculate a time by adding a maximum encoding delay time that can occur at the time of encoding performed by each of the encoding devices to a value of an STC counter indicating a time when each of the encoding devices captures the partitioned image data. The plurality of decoding devices calculate a time by adding stream fluctuations and a maximum possible value of a decoding delay time to the time calculated by the encoding apparatus, and output the image data to a synthesis unit for synthesizing image data at the calculated time. Such a method aims at properly displaying a moving image signal having a high resolution (for example, see Patent Document 4).

Patent Document 1: Japanese Laid-open Patent Publication No. H11-239347
Patent Document 2: Japanese Laid-open Patent Publication No. H10-234043
Patent Document 3: Japanese Laid-open Patent Publication No. H8-79701
Patent Document 4: Japanese Laid-open Patent Publication No. 2008-166862

SUMMARY

According to an aspect of the invention, an encoding apparatus includes a plurality of encoders configured to respectively encode one different image among a plurality of images obtained by partitioning a captured image. The plurality of encoders respectively transmit encoded information including an encoded image obtained by encoding one image among the plurality of images, and time information corresponding to the one image. At least one of the plurality of encoders transmits, along with the encoded image, identification information for respectively identifying the plurality of images obtained by partitioning the captured image.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates a configuration of a video image transmission system according to a first embodiment.
FIG. 2 illustrates a concept of operations of the video image transmission system according to the first embodiment.

FIG. 12 is a flowchart illustrating operations of the encoder according to the first embodiment.

FIG. 21 illustrates one example of functional blocks of a decoder according to the second embodiment.

FIG. 22 conceptually illustrates TS streams according to the second embodiment.

FIG. 23 is a flowchart illustrating operations of the encoder according to the second embodiment.

DESCRIPTION OF EMBODIMENTS

Figure 3:
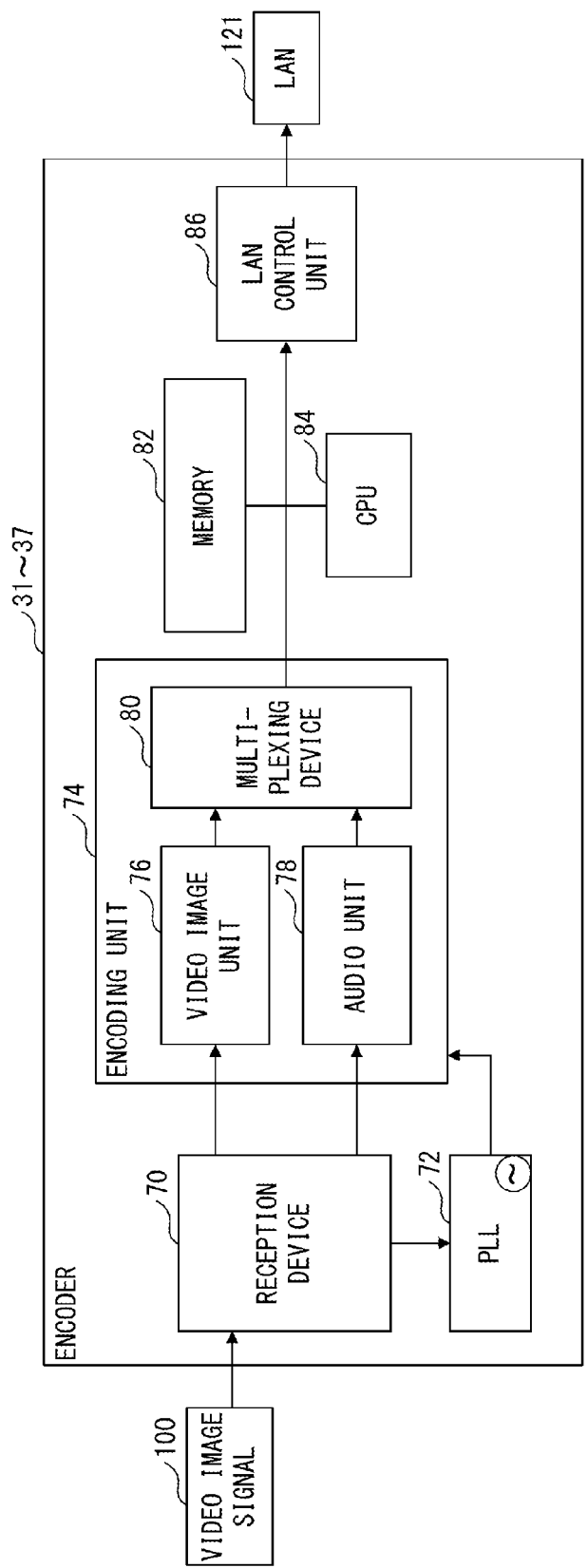
FIG. 3 is a block diagram illustrating one example of a hardware configuration of an encoder according to the first embodiment.

For example, when outputs of, for example, Digital Video Broadcasting-Asynchronous Serial Interface (DVB-ASI) widely used in a broadcasting field are multiplexed into one stream, the stream is transmitted with following procedure. Namely, data output from encoders with DVB-ASI are multiplexed into one stream and transmitted in an IP network, and the stream is demultiplexed with DVB-ASI on a receiving side.

Specifically, Transport Stream (TS) streams are output from the encoders with DVB-ASI, multiplexed by a Multiplex (MUX) device into one TS stream, and output with DVB-ASI. Then, the TS stream is transmitted with a DVB-ASI-to-IP conversion device in the IP network, received with an IP-to-DVB-ASI conversion device, and output with DVB-ASI. Then, the TS stream is demultiplexed by a Demultiplex (DEMUX) device into individual TS streams, and input to decoders.

As described above, in comparison with a case where data is transmitted with DVB-ASI, this system additionally needs the devices such as the MUX device, the DVB-ASI-to-IP conversion device, the IP-to-DVB-ASI conversion device, and the DEMUX device, leading to an expensive system.

Additionally, especially when image data is transmitted in an IP network in an example where a maximum delay time that can occur is predicted, it is needed to take into account a possibility that a delay time exceeding a predicted time occurs. When the delay time exceeding the predicted time occurs, properly synchronized images cannot be displayed in some cases with the above described conventional techniques.

Embodiments of the present invention will be explained with reference to accompanying drawings.

(First Embodiment) A first embodiment is described below with reference to the drawings. Hereinafter assume that a video image signal is a signal including a video image and audio output from a camera, or a signal including a video image and audio input to a display device, and video image information and audio information are information respectively corresponding to a video image portion and an audio portion, which are respectively demultiplexed from the video image signal. Also assume that picture data is information corresponding to one picture (one image) encoded from video image information, and an encoded picture is information to which a Presentation Time Stamp (PTS) value to be described later is added to picture data. Further assume that encoded audio is information obtained by compressing and encoding audio information. Still further assume that a stream is information where a plurality of encoded pictures are successive, or information including encoded audio, and Program Clock Reference (PCR), which is a reference time at the time of decoding.

FIG. 1 illustrates a configuration of a video image transmission system 1 according to the first embodiment. FIG. 2 illustrates a concept of operations of the video image transmission system 1. As illustrated in FIG. 1, the video image transmission system 1 is a system where an encoding apparatus 3 to which a camera 9 is connected and a decoding apparatus 5 to which a display device 11 is connected are connected via an IP network 7.

The video image transmission system 1 is a system for partitioning and encoding a video image of 4K2K size, a super hi-vision video image equal to or larger than 4K2K, such as super hi-vision or the like, or a 3D video image, for transmitting the encoded video images by using the IP network 7 in real time, and for synchronizing and playing back the video images in the decoding apparatus. In such a system, to partition one video image and transmit the partitioned video images with pluralities of encoders and decoders at an accurate rate available in a broadcasting field, the following procedure is needed. Namely, it is needed to transmit the video images by using a video image/audio multiplexing scheme that can transmit also an accurate display clock widely used in the broadcasting field. In this embodiment, video images are transmitted, for example, by using Moving Picture Experts Group 2-Transport Stream (MPEG2-TS) scheme.

The encoding apparatus 3 according to this embodiment includes four encoders 31 to 37, and a HUB 39. As illustrated in FIGS. 1 and 2, the encoders 31 to 37 are encoding devices for encoding four partitioned video images 22 to 28 into which an original video image 20 is partitioned, and for outputting the encoded video images as a stream. In this embodiment, the encoders 31 to 37 compress a video image and audio with H.264, MPEG2, etc./MPEG1-Layer 2, Advanced Audio Coding (AAC), High Efficiency (HE)-AAC, or the like. Moreover, the encoders 31 to 37 transmit the compressed data, for example, by using the MPEG2-TS scheme. The HUB 39 is a device for conveying information by aggregating a plurality of cables. The camera 9 is an image capturing device for partitioning, for example, a video image signal of 4K2K into a plurality of partitioned video images, and for outputting the partitioned video images.

The encoders 31 to 37 are connected to the single camera 9, and respectively obtain the four video image signals partitioned by the camera 9. The encoders 31 to 37 encode the video image signal in synchronization with the single camera 9. Therefore, timings of vertical synchronization signals (Vsyn) of the encoded pictures match. When the partitioned video images 22 to 28 are simply input to the encoders 31 to 37 and encoded, System Time Clocks (STCs) of the encoders 31 to 37 proceed in synchronization. This is because the vertical synchronization signals captured by the encoders 31 to 37 are synchronous with one another. However, since initial values of STCs are different, STC values differ. Therefore, also PTS values added to pictures based on the partitioned video images 22 to 28 of the same original image 20, which are respectively encoded by the encoders 31 to 37, differ as will be described later.

Accordingly, in this embodiment, one of the encoders 31 to 37 is caused to function as a master encoder, and the three other encoders are caused to function as slave encoders. The slave encoders notify the master encoder of an STC value of, for example, rising or falling (hereinafter referred to as timing of a vertical synchronization signal) of the vertical synchronization signal of each picture corresponding to a partitioned video image. The master encoder generates STC data for identifying a plurality of partitioned images into which a captured image of one screen is partitioned based on the obtained STC value. Details of the STC data will be described later. Which of the encoders 31 to 37 for encoding which of the partitioned video images 22 to 28 is set as the master encoder is not limited. However, the description is provided by assuming the encoder 31 as the master encoder in the following example.

When the encoder 31 is decided as one master encoder, the encoder 31 obtains an STC value of timing of the vertical synchronization signal from each of the encoders 33 to 37 via Local Area Network (LAN) 121. The encoders 33 to 37 notify the encoder 31 of the STC value of the vertical synchronization signals corresponding to each of the partitioned video image obtained by partitioning the captured image.

The decoding apparatus 5 according to this embodiment includes four decoders 51 to 57, a distributor 59, and a HUB 61. The decoding apparatus 5 is a decoding apparatus for decoding information that is encoded by the encoding apparatus 3 and transmitted via the IP network 7, and for playing back a playback video image 40 by displaying partitioned video images 42 to 48 as illustrated in FIGS. 1 and 2. The distributor 59 is a device for distributing a clock (Generator Lock: GENLOCK) obtained from the decoder 51 to the decoders 53 to 57. The HUB 61 is a device for conveying information by aggregating a plurality of cables. The display device 11 is a device for synthesizing and displaying the partitioned video images 42 to 48 decoded by the decoding apparatus 5.

One of the decoders 51 to 57 functions as a master decoder, and the three other decoders function as slave decoders. The master decoder is a decoder for decoding a video image encoded by the master decoder, and for instructing the slave decoders of timing for playing back a video image. Which of the slave decoders decodes an encoded picture output from which of the slave encoders is not limited. The description is provided by assuming the decoder 51 as a master decoder in the following example.

Configurations of the encoders 31 to 37 are described below with reference to FIGS. 3 to 7. FIG. 3 illustrates one example of a hardware configuration of the encoders 31 to 37. The encoders 31 to 37 include a reception device 70, Phase Locked Loop (PLL) 72, an encoding unit 74, a memory 82, Central Processing Unit (CPU) 84, and a LAN control unit 86.

The encoding unit 74 includes a video image unit 76, an audio unit 78, and a multiplexing device 80. The reception device 70 receives, for example, a video image signal 100 of High Definition-Serial Digital Interface (HD-SDI) scheme output from the camera 9. The encoding unit 74 encodes the received video image signal. At this time, the video image unit 76 encodes video image information within the video image signal, and the audio unit 78 encodes audio information within the signal. The multiplexing device 80 is a device for generating a stream by multiplexing an encoded video image and audio. The memory 82 is a storage device for temporarily storing the generated stream. The CPU 84 outputs the stream that is output from the encoding unit 74 and temporarily stored in the memory 82 to the LAN 121 via the LAN control unit 86. The PLL 72 generates an operational clock of the encoding unit 74 from the video image signal input to the encoders 31 to 37.

Figure 4:
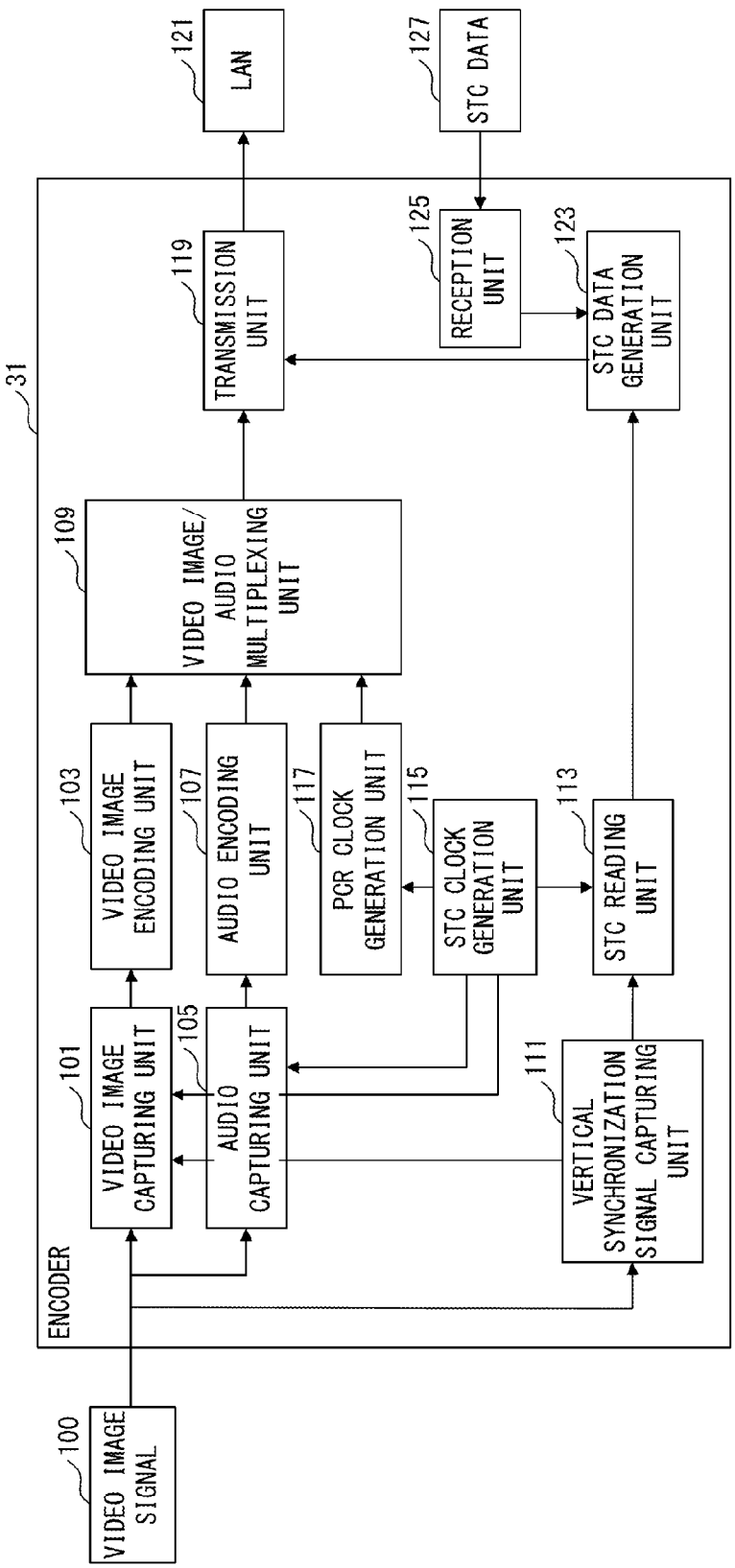
FIG. 4 is a block diagram illustrating one example of functions of an encoder according to the first embodiment.

FIG. 4 is a block diagram illustrating functions of the encoder 31. In this embodiment, the encoder 31 is a master encoder. As illustrated in FIG. 4, the encoder 31 has functions of a video image capturing unit 101, a video image encoding unit 103, an audio capturing unit 105, an audio encoding unit, and a video image/audio multiplexing unit 109. The encoder 31 further has functions of a vertical synchronization signal capturing unit 111, an STC reading unit 113, an STC clock generation unit 115, a PCR clock generation unit 117, a transmission unit 119, an STC data generation unit 123, and a reception unit 125.

The video image capturing unit 101 obtains a video image portion (video image information) of, for example, a video image signal of HD-SDI scheme. At this time, the video image capturing unit 101 obtains video image information for each vertical synchronization signal. Namely, the video image capturing unit 101 of the encoder 31 captures the partitioned video image 22 for each vertical synchronization signal to be described later, and stores as a PTS value, for example, an STC value of timing of the vertical synchronization signal when the video image capturing unit 101 captures the partitioned video image 22.

The video image encoding unit 103 encodes the video image information obtained by the video image capturing unit 101 as picture data. The video image encoding unit 103 generates an encoded picture by encoding the video image information, for example, in conformity with the MPEG2 standard. At this time, the video image encoding unit 103 generates an encoded picture by adding, to each picture data, the PTS value stored as a value that indicates a playback time in the decoding apparatus 5.

The audio capturing unit 105 obtains an audio portion (audio information) of the video image signal of HD-SDI scheme from the camera 9. The audio encoding unit 107 generates encoded audio by encoding the audio information obtained by the audio capturing unit 105. At this time, the audio encoding unit 107 encodes the audio information in conformity with a standard such as AAC, HE-AAC, or the like.

The vertical synchronization signal capturing unit 111 obtains a vertical synchronization signal (Vsync) from a video image signal of the camera 9, outputs the obtained signal to the video image capturing unit 101 and the STC reading unit 113, and measures a cycle of the vertical synchronization signal. The STC clock generation unit 115 generates a clock synchronous with the vertical synchronization signal of the video image signal 100 as a clock, which is a reference in the encoder 31, and outputs the clock to the video image capturing unit 101, the audio capturing unit 105, the STC reading unit 113, and the PCR clock generation unit 117. STC is a clock, which is a reference for encoding or playing back a video image in each encoder and decoder in video image encoding in conformity with H.264 or MPEG2.

The PCR clock generation unit 117 generates PCR by adding a processing delay time of encoding to an STC value. The video image/audio multiplexing unit 109 generates a TS stream that includes encoded pictures in time series by multiplexing the encoded video image, audio, and the generated PCR.

In the meantime, the STC reading unit 113 reads an STC value, for example, at a time when the vertical synchronization signal capturing unit 111 obtains a vertical synchronization signal. Moreover, the STC reading unit 113 calculates the STC value of the next vertical synchronization signal by adding the cycle of the vertical synchronization signal measured by the vertical synchronization signal capturing unit 111 to the obtained STC value. The reception unit 125 obtains the STC value of timing of the vertical synchronization signal, for example, according to the partitioned video images 24 to 28 from the encoders 33 to 37, which are slave encoders, for example, via the LAN 121. The STC data generation unit 123 generates STC data based on the STC value of the local encoder 31, which is obtained by the STC reading unit 113, and STC values obtained from the encoders 33 to 37. An STC value included in STC data is hereinafter referred to as a reference STC value. The transmission unit 119 transmits the generated TS stream and STC data to the IP network 7 via the LAN 121 and the HUB 39.

Figure 5:
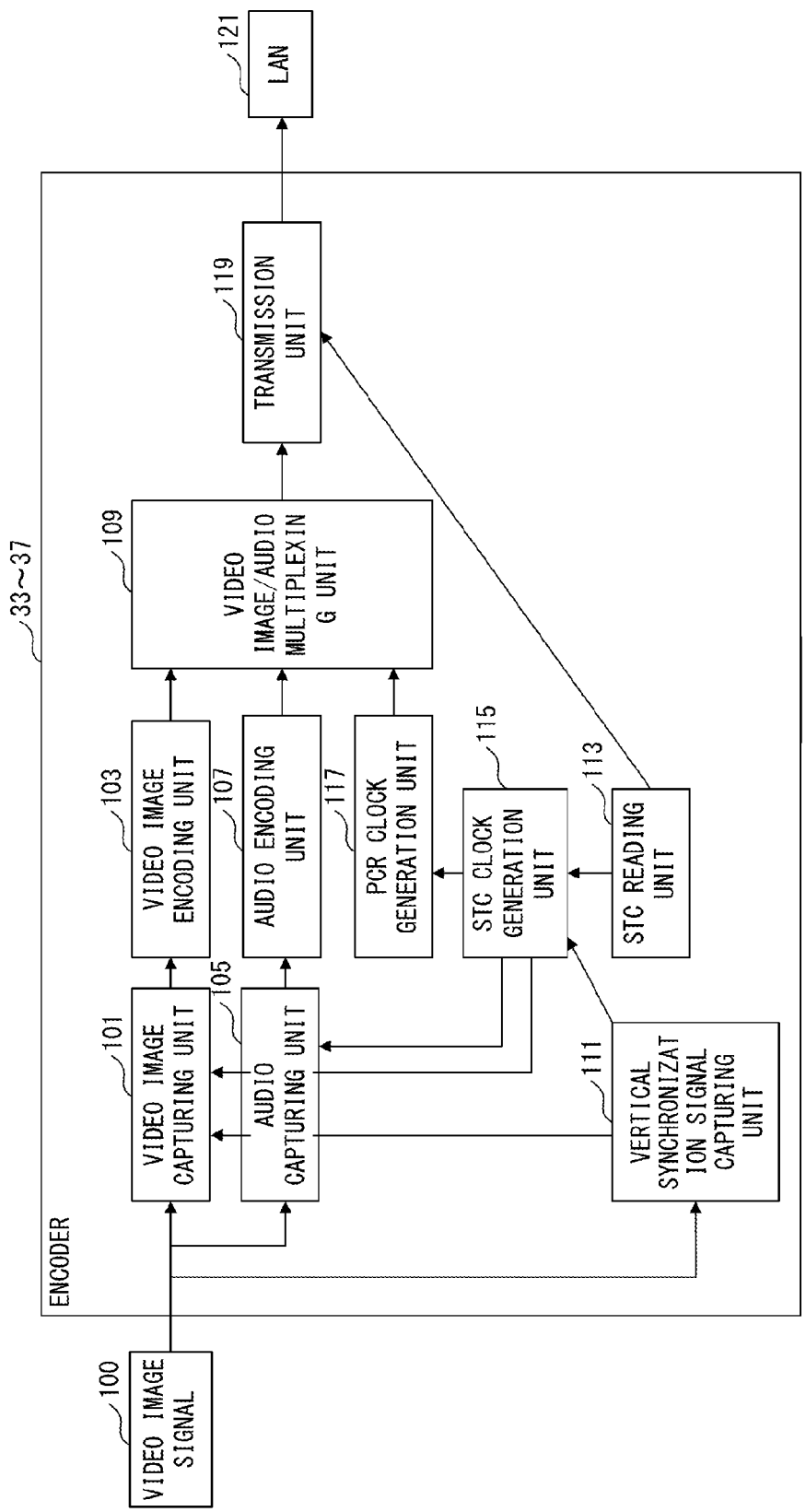
FIG. 5 is a block diagram illustrating one example of functions of an encoder according to the first embodiment.

FIG. 5 is a functional block diagram of the encoders 33 to 37. The encoders 33 to 37 are represented by the same functional block diagram. The same components as those of the encoder 31 are denoted with the same reference numerals in FIG. 5, and their detailed descriptions are omitted. As illustrated in FIG. 5, the encoders 33 to 37 have the functions of the video image capturing unit 101, the video image encoding unit 103, the audio capturing unit 105, the audio encoding unit 107, and the video image/audio multiplexing unit 109 similarly to the encoder 31. The encoders 33 to 37 further have the functions of the vertical synchronization signal capturing unit 111, the STC reading unit 113, the STC clock generation unit 115, the PCR clock generation unit 117, and the transmission unit 119 similarly to the encoder 31.

The video image capturing unit 101 captures each of the partitioned video images 24 to 28 from the camera 9 for each vertical synchronization signal, and stores, as a PTS value, an STC value when each of the video images is captured. At this time, STC generated by the STC clock generation unit 115 does not always match those of the other encoders 31 to 37 as described above. Operations of the video image encoding unit 103, the audio capturing unit 105, the audio encoding unit 107, the video image/audio multiplexing unit 109, the vertical synchronization signal capturing unit 111, the STC reading unit 113, and the like are similar to those of the encoder 31. The encoders 33 to 37 transmit the STC value read by the STC reading unit 113 to the encoder 31 via the transmission unit 119 and the LAN 121. The encoders 33 to 37 multiplex the encoded video image and audio, and the generated PCR, and output a TS stream that includes encoded pictures in time series.

By configuring the encoders 31 to 37 as described above, streams based on the original video image 20, which are transmitted via the IP network 7, result in four separate streams obtained by respectively encoding the partitioned video images 22 to 28. Moreover, the encoder 31 generates and transmits STC data including the four reference STC values corresponding to the partitioned video images 22 to 28 of the original video image 20.

The components corresponding to the functions included in the encoders 31 to 37 illustrated in FIGS. 4 and 5 may be separately formed circuits. Alternatively, the encoders 31 to 37 may be mounted as an integrated circuit for implementing some or all of these components. Further alternatively, the components may be functional modules implemented by a program executed in a processor included in each of the encoders 31 to 37.

The decoder according to this embodiment is described next. In this embodiment, the decoder 51 is decided as a master decoder among the decoders 51 to 57, and the decoder is configured to synchronize timings of video image playback of the decoders 51 to 57. Moreover, the decoder 51 receives data transmitted from the master encoder.

Figure 6:
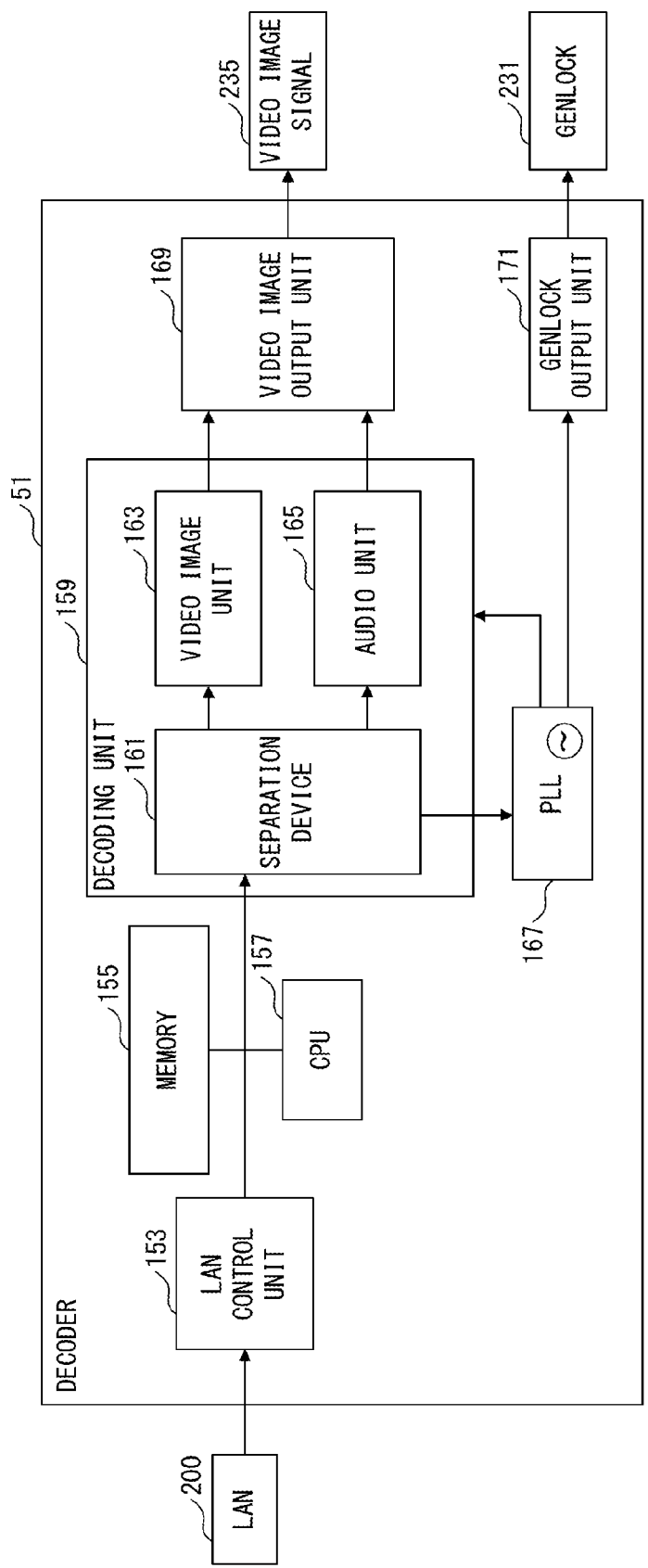
FIG. 6 is a block diagram illustrating one example of a hardware configuration of a decoder according to the first embodiment.
Figure 7:
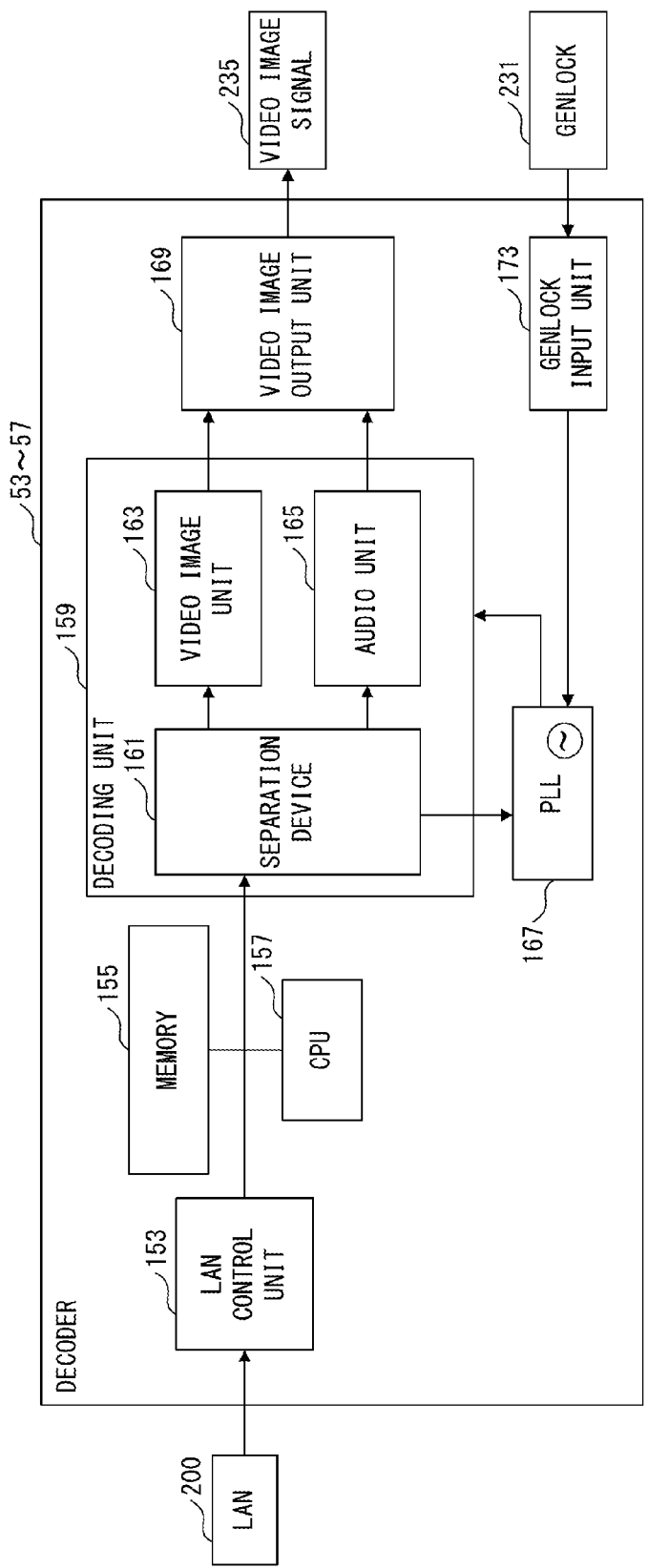
FIG. 7 is a block diagram illustrating one example of a hardware configuration of a decoder according to the first embodiment.

FIG. 6 is a block diagram illustrating one example of a hardware configuration of the decoder 51 according to this embodiment. FIG. 7 is a block diagram illustrating one example of a hardware configuration of the decoders 53 to 57 according to this embodiment.

As illustrated in FIG. 6, the decoder 51 includes a LAN control unit 153, a memory 155, a CPU 157, a decoding unit 159, a PLL 167, a video image output unit 169, and a GENLOCK output unit 171. The decoding unit 159 includes a demultiplexing device 161, a video image unit 163, and an audio unit 165.

The LAN control unit 153 controls communications with the decoders 53 to 57, the distributor 59 and the like via the LAN 121. The memory 155 is a storage device for storing a stream of an encoded video image, which is received via the LAN 121. The CPU 157 is a central processing unit for controlling a transfer of data from the memory 155, and the like.

The decoding unit 159 decodes the stream of the encoded video image, which is obtained via the LAN 121. At this time, the demultiplexing device 161 demultiplexes a video image portion, an audio portion, and PCR from the received stream. The video image unit 163 decodes information of the video image portion. The audio unit 165 decodes information of the audio portion.

The PLL 167 generates an operational clock of the decoding unit 159 based on the PCR demultiplexed by the demultiplexing device 161. The video image output unit 169 outputs the information of the decoded video image and audio. The GENLOCK output unit 171 generates a GENLOCK signal 231 based on the PLL 167, and outputs the GENLOCK signal 231 to the distributor 59.

The decoder 51 captures the stream of the encoded video image via the LAN control unit 153. The CPU 157 inputs the captured stream to the decoding unit 159 via the memory 155. In the decoding unit 159, the demultiplexing device 161 demultiplexes the input stream into the video image portion and the audio portion, and outputs the video image portion and the audio portion respectively to the video image unit 163 and the audio unit 165. Moreover, the demultiplexing device 161 demultiplexes PCR from the input stream. The PLL 167 generates an operational clock of the decoding unit 159 based on the PCR. The video image signal 235, for example, of HD-SDI scheme, which is decoded by the video image unit 163 and the audio unit 165, is output from the video image output unit 169. Moreover, the decoder 51 outputs the GENLOCK signal 231 to the distributor 59 by using the GENLOCK output unit 171.

As illustrated in FIG. 7, the same components as those of the decoder 51 are denoted with the same reference numerals in the decoders 53 to 57, and their detailed descriptions are omitted. The decoders 53 to 57 respectively include the LAN control unit 153, the memory 155, the CPU 157, the decoding unit 159, the PLL 167, and the video image output unit 169 similarly to the decoder 51. The decoding unit 159 includes the demultiplexing device 161, the video image unit 163, and the audio unit 165. The decoders 53 to 57 include a GENLOCK input unit 173 as a replacement for the GENLOCK output unit 171 of the decoder 51.

In the decoders 53 to 57, the GENLOCK input unit 173 obtains the GENLOCK signal 231 from the distributor 59, and the PLL 167 generates a clock based on the GENLOCK signal 231. Other components are the same as those of the decoder 51.

Figure 8:
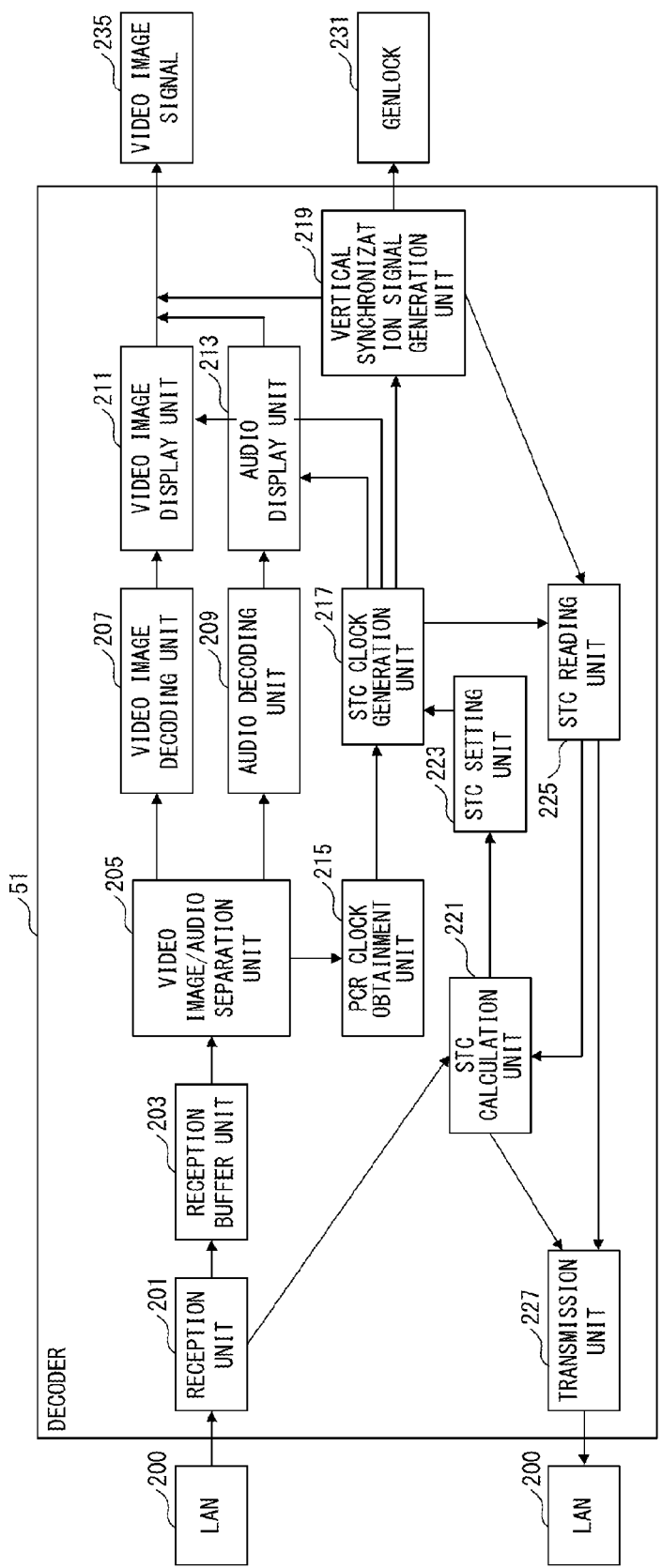
FIG. 8 is a block diagram illustrating one example of functions of the decoder according to the first embodiment.
Figure 9:
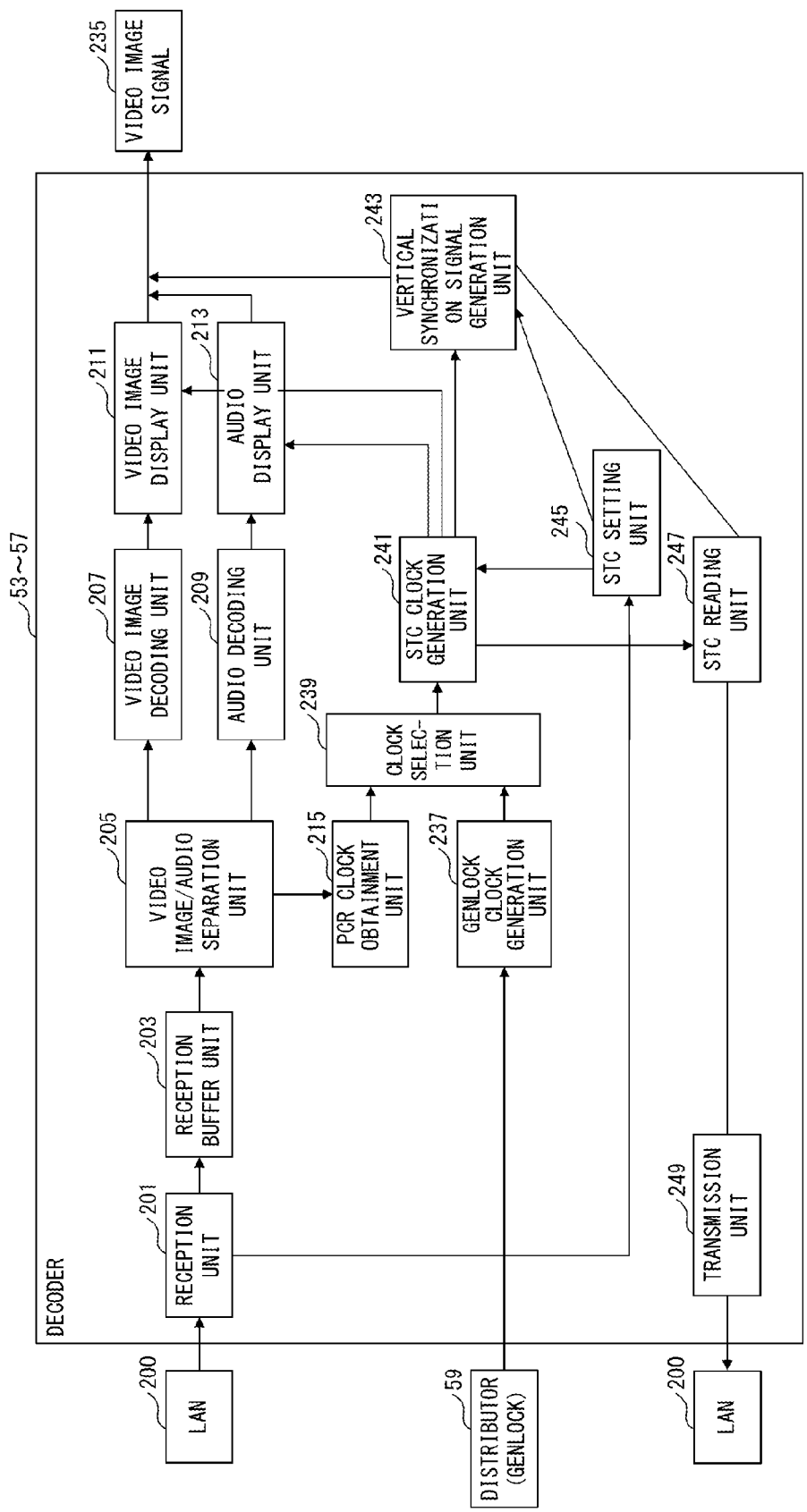
FIG. 9 is a block diagram illustrating one example of functions of the decoder according to the first embodiment.

Functions of the decoders 51 to 57 according to this embodiment are described next with reference to FIGS. 8 and 9. FIG. 8 is a block diagram illustrating the functions of the decoder 51, whereas FIG. 9 is a block diagram illustrating the functions of the decoders 53 to 57. Since TS streams of the four encoders 31 to 37 are transmitted as separate TS streams as described above in this embodiment, the individual TS streams arrive at the decoders at different times. Accordingly, when the decoding apparatus 5 simply plays back the TS streams received by the decoders 51 to 57 without synchronizing the streams, the decoding apparatus 5 plays back different video images respectively for the partitioned screens. Moreover, in this embodiment, PTS values assigned to partitioned video images that are included in the respective TS streams and obtained by partitioning a captured video image of one screen are not uniformed. Accordingly, by referencing the STC data, the decoder side identifies the video images into which the original video image 20 is partitioned, and sets a time for playing back the partitioned video images.

The functions of the decoder 51 are described below with reference to FIG. 8. As illustrated in FIG. 8, the decoder 51 has the functions of a reception unit 201, a reception buffer unit 201, a video image/audio demultiplexing unit 205, a video image decoding unit 207, an audio decoding unit 209, a video image display unit 211, and an audio display unit 213. The decoder 51 also has functions of a PCR clock obtainment unit 215, an STC clock generation unit 217, a vertical synchronization signal generation unit 219, an STC calculation unit 221, an STC setting unit 223, an STC reading unit 225, and a transmission unit 227.

The reception unit 201 receives, for example, a TS stream, into which the original video image 20 is partitioned and which is encoded and transmitted from the encoder 31 via the IP network 7, and STC data. The reception buffer unit 203 smoothes fluctuations of the IP network 7 by temporarily storing the received information. The video image/audio demultiplexing unit 205 demultiplexes a video image portion, an audio portion, and PCR from the received TS stream. The video image/audio demultiplexing unit 205 outputs the demultiplexed PCR to the PCR clock obtainment unit 215, and outputs the demultiplexed encoded picture and audio to the video image decoding unit 207 and the audio decoding unit 209.

The PCR clock obtainment unit 215 obtains the demultiplexed PCR, and outputs the obtained PCR to the STC clock generation unit 217. The STC clock generation unit 217 generates an STC clock based on the obtained PCR and STC. At this time, the STC clock generation unit 217 generates an STC clock synchronous with a set STC value when the STC value of the next vertical synchronization signal is set. The STC clock generation unit 217 outputs the generated STC clock to the video image display unit 211, the audio display unit 213, and the vertical synchronization signal generation unit 219. The vertical synchronization signal generation unit 219 generates a vertical synchronization signal by using the generated STC clock, outputs the generated signal as the GENLOCK signal 231 to the distributor 59, and outputs the vertical synchronization signal generated also in the GENLOCK signal 231. The GENLOCK signal 231 is a signal for synchronizing the decoders 51 to 57.

The STC reading unit 225 reads an STC value of timing of a vertical synchronization signal corresponding to the next picture by obtaining the vertical synchronization signal from the vertical synchronization signal generation unit 219, and by referencing the clock generated by the STC clock generation unit 217. The read STC value is hereinafter referred to as an initial STC value of the decoder 51.

The STC calculation unit 221 makes a request to transmit the STC value of timing of the vertical synchronization signal of a picture next to the picture corresponding to the reference STC value included in the STC data received by the reception unit 201 to the decoders 53 to 57 via the transmission unit 227. The requested STC value is referred to as an initial STC value of each of the decoders 53 to 57. The reception unit 201 obtains the initial STC values from the decoders 53 to 57, and outputs the obtained values to the STC calculation unit 221.

The STC calculation unit 221 extracts a maximum value of a difference between the reference STC value of the encoders 31 to 37, which is included in the STC data, and each of the initial STC values of the decoders 51 to 57, which include the initial STC value of the local decoder that is obtained by the STC reading unit 225 and corresponds to the next picture. The initial STC value corresponding to the extracted maximum value is referred to as a maximum STC value.

The STC calculation unit 221 sets the obtained maximum STC value as a set STC value of the timing of the vertical synchronization signal of the next picture in the corresponding decoder. Moreover, the STC calculation unit 221 calculates an STC value to be set in each of the other decoders by adding, to the maximum STC value, a value obtained by subtracting the reference STC value corresponding to the obtained maximum STC value from each of the other reference STC values. The calculated STC value is referred to as a set STC value of each of the decoders.

The STC calculation unit 221 outputs the calculated set STC value corresponding to the decoder 51 to the STC setting unit 223. Moreover, the STC calculation unit 221 notifies each of the decoders 53 to 57 of the set STC value corresponding to each of the decoders 53 to 57 via the transmission unit 227. The STC setting unit 223 notifies the STC clock generation unit 217 of the calculated STC value.

The video image decoding unit 207 decodes a video image, and outputs the decoded video image to the video image display unit 211. The audio decoding unit 209 decodes audio, and outputs the decoded audio to the audio display unit 213. The video image display unit 211 outputs the decoded video image information based on STC and PTS. The audio display unit 213 outputs the decoded audio information. The video image information and the audio information are output as a video image signal 235 according to a vertical synchronization signal output from the vertical synchronization signal generation unit 219, and the display device 11 is caused to display the partitioned image 42.

Functions of the decoders 53 to 57 are described below with reference to FIG. 9. The same components as those of the decoder 51 are denoted with the same reference numerals, and their detailed descriptions are omitted. As illustrated in FIG. 9, the decoders 53 to 57 respectively include the reception unit 201, the reception buffer unit 201, the video image/audio demultiplexing unit 205, the video image decoding unit 207, the audio decoding unit 209, the video image display unit 211, and the audio display unit 213 similarly to the decoder 51. The decoders 53 to 57 also include the PCR clock obtainment unit 215, a GENLOCK clock generation unit 237, a clock selection unit 239, an STC clock generation unit 241, a vertical synchronization signal generation unit 243, an STC setting unit 245, an STC reading unit 247, and a transmission unit 249.

The PCR clock obtainment unit 215 obtains PCR demultiplexed by the video image/audio demultiplexing unit 205 at the reception start of a TS stream similarly to the decoder 51. The clock selection unit 239 switches a clock as a reference of the STC clock by making switching for connecting either the PCR clock obtainment unit 215 or the GENLOCK clock generation unit 237 to the STC clock generation unit 241. The clock selection unit 239 connects the PCR clock obtainment unit 215 to the STC clock generation unit 241 so that an STC clock is generated from the PCR clock obtained by the PCR clock obtainment unit 215 at the start of reception of a TS stream similarly to the decoder 51. When the STC value of the next vertical synchronization signal is notified from the decoder 51, the clock selection unit 239 connects the GENLOCK clock generation unit 237 to the STC clock generation unit 241. The GENLOCK clock generation unit 237 obtains the GENLOCK signal 231 from the distributor 59.

The STC clock generation unit 241 generates an STC clock based on the clock input via the clock selection unit 239. When the PCR clock obtainment unit 215 is connected to the STC clock generation unit 241, the vertical synchronization signal generation unit 243 generates a vertical synchronization signal by using the STC clock with the vertical synchronization signal generation unit 243 similarly to the decoder 51. When the GENLOCK clock generation unit 237 is connected to the STC clock generation unit 241, the vertical synchronization signal generation unit 243 generates a vertical synchronization signal from the GENLOCK signal 231. Video image information and audio information are output to the display device 11 based on the generated vertical synchronization signal.

The STC reading unit 247 reads an initial STC value at timing of a vertical synchronization signal of the picture next to the picture corresponding to the reference STC value requested by the decoder 51 after the STC clock generation unit 241 starts to generate the STC clock. Moreover, the STC reading unit 247 notifies the decoder 51 of the read initial STC value via the transmission unit 249 and the LAN 200.

The reception unit 201 receives the TS stream from the encoder, also receives the set STC value of the next vertical synchronization signal from the decoder 51, and notifies the STC setting unit 245 of the received value. The STC setting unit 245 sets the STC value of the local decoder to the set STC value notified from the decoder 51 by notifying the SIC clock generation unit 241 of the received set STC value. Based on thus set STC value and vertical synchronization signal, the decoders 53 to 57 output the video image signal 235, and cause the display device 11 to display the partitioned video images 44 to 48.

Note that the components corresponding to the functions respectively included in the decoders 51 to 57 illustrated in FIGS. 7 and 8 may be separately formed circuits. Alternatively, the decoders 51 to 57 may be mounted as an integrated circuit for implementing some or all of these components. Further alternatively, these components may be functional modules implemented with a program executed in a central processing unit included in each of the decoders 51 to 57.

Figure 10:
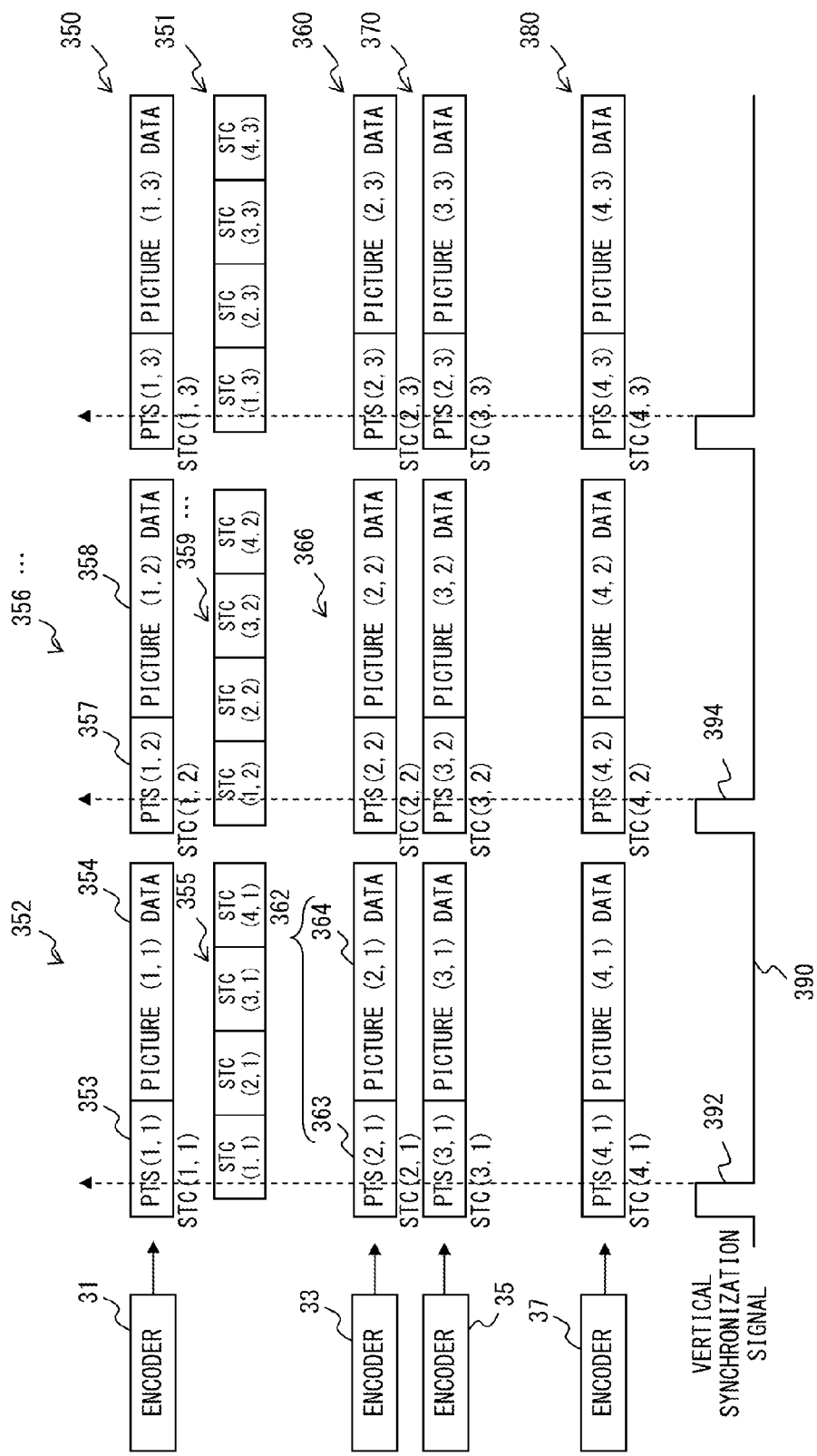
FIG. 10 conceptually illustrates TS streams according to the first embodiment.

A concept of streams generated by the above described encoding apparatus 3 is described next with reference to FIGS. 10 and 11. FIG. 10 conceptually illustrates TS streams 350, 360, 370, and 380 (collectively referred to as TS streams 350 to 380) generated by the above described encoders 31 to 37, and STC data 355, 359, . . . (collectively referred to also as STC data 351 hereinafter). As illustrated in FIG. 10, the encoders 31 to 37 generate the TS streams 350 to 380 by encoding video image signals of partitioned video images obtained from the camera 9. For example, the TS stream 350 includes an encoded picture 352, an encoded picture 356 and the like. For example, the TS stream 360 includes an encoded picture 362, an encoded picture 366 and the like.

At this time, for example, the encoded picture 352 is a picture obtained by encoding the partitioned video images 22 and 24 into which the same original video image 20 as the encoded picture 362 is partitioned. However, attached PTS 353 and PTS 363 are respectively different values such as PTS (1,1), PTS(2,1), PTS(3,1), and PTS(4,1).

The STC data 355 is output from the encoder 31 in addition to the encoded picture 352. The STC data 355 includes, for example, STC (1,1), STC(2,1), STC(3,1), and STC(4,1) as reference STC values corresponding to the vertical synchronization signals of the partitioned video images 22 to 28 into which the original video image 20 is partitioned. Note that PTS (1,1), PTS(2,1), PTS(3,1), and PTS(4,1) are values having, for example, the same difference as that of STC (1,1), STC(2,1), STC(3,1), and STC(4, 1).

When the TS streams 350 to 380 are transmitted via the IP network 7, delays times caused by the transmissions are not uniform. Therefore, times at which the TS streams 350 to 380 arrive at the decoders 51 to 57 are different. Accordingly, set STC values are adjusted based on the reference STC values included in the STC data, and the initial STC values of the decoders 51 to 57.

Figure 11:
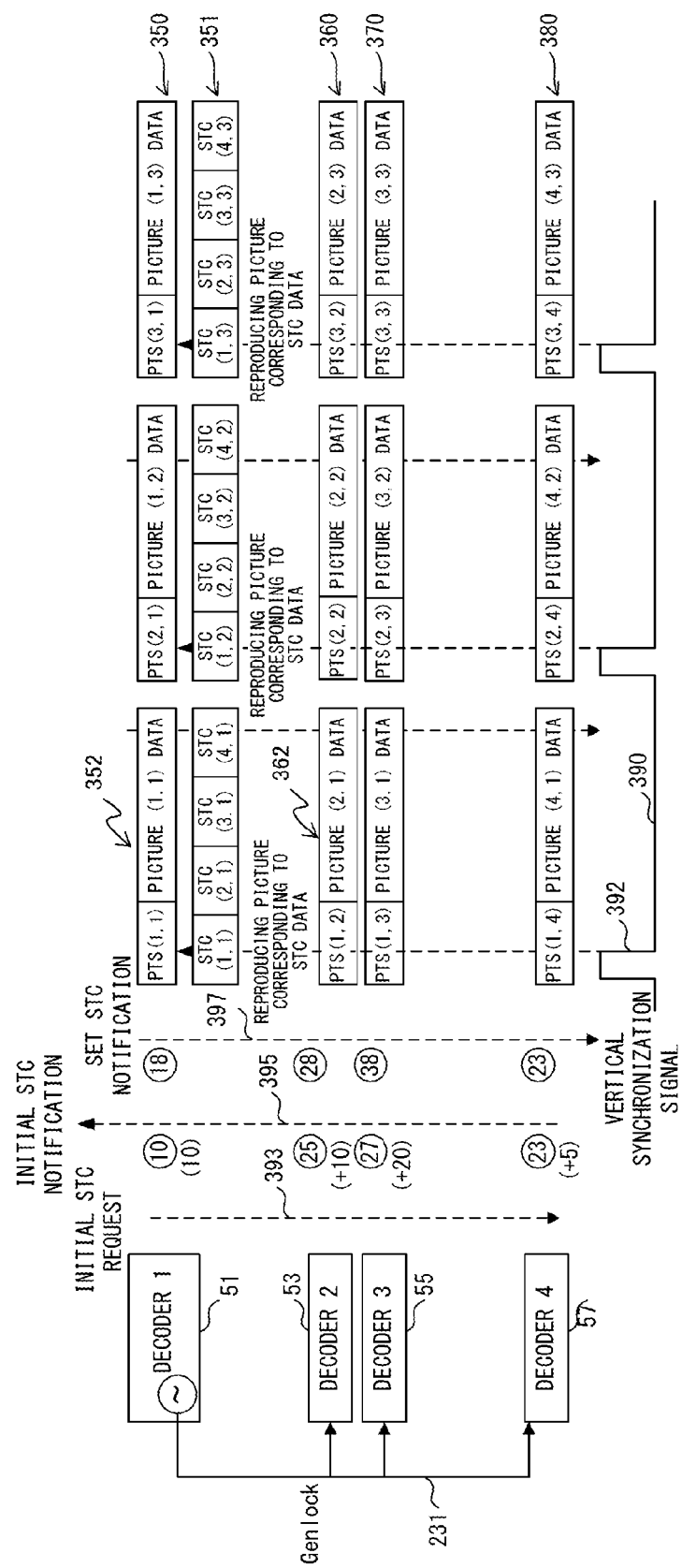
FIG. 11 conceptually illustrates one example of the TS streams according to the first embodiment after the TS streams are communicated in an IP network.

FIG. 11 conceptually illustrates the TS streams 350 to 380 and the STC data 351 in the decoders 51 to 57. As illustrated in FIG. 12, the decoders 51 to 57 respectively receive the TS streams 350 to 380 and the STC data 351 from the encoders 31 to 37. The decoder 51 supplies the GENLOCK signal 231 to the decoders 53 to 57 via the distributor 59.

At this time, for example, the encoded picture 352 is a picture obtained by encoding the partitioned images 22 and 24 into which the same original video image 20 as the encoded picture 362 is partitioned. However, attached PTS 353 and PTS 363 are respectively different values such as PTS (1,1), PTS(2,1), PTS(3,1), and PTS(4,1).

The STC data 355 is output from the encoder 31 in addition to the encoded picture 352. The STC data 355 includes, for example, STC(1,1), STC(2,1), STC(3,1), and STC(4,1) as reference STC values corresponding to the vertical synchronization signals of the partitioned video images 22 to 28 into which the original video image 20 is partitioned. Assume that STC(1,1)=0, STC(2,1)=10, STC(3, 1)=20, and STC(4,1)=5 are notified as the STC data 355.

Note that PTS (1,1), PTS(2,1), PTS(3,1), and PTS(4,1) have values having the same difference as that of STC(1,1), STC(2,1), STC(3,1), and STC(4,1).

An arrow 393 indicates that the decoder 51 makes, to each of the decoders 53 to 57, a request of an initial STC value corresponding to the reference STC value included in the STC data. An arrow 395 indicates that the decoders 53 to 57 respectively calculate the STC value of timing of the next vertical synchronization signal, and notify the decoder 51 of the calculated value. Assume that the initial STC values of the decoders 51 to 57 are "10", "25", "27", and "23" in this order as illustrated in FIG. 11. FIG. 11 illustrates one example of the reference STC values in the STC data 355 within parentheses along with the initial STC values.

An arrow 397 indicates that the decoder 51 notifies each of the decoders 53 to 57 of the set STC value calculated based on the reference STC value and the initial STC value. In the example of FIG. 10, a maximum value of the initial STC value for which the reference STC value is taken into account is "23" in the decoder 57. Accordingly, the set STC values of the decoders 51 to 57 result in "18", "28", "38", and "23".

Operations of the encoding apparatus 3 and the decoding apparatus 5, which are configured as described above, are described with reference to flowcharts. The operations of the encoding apparatus 3 according to this embodiment are initially described with reference to FIGS. 12 and 13. FIG. 12 is a flowchart illustrating operations of the encoder 31, whereas FIG. 13 is a flowchart illustrating operations of the encoders 33 to 37.

As illustrated in FIG. 12, the encoder 31 initially detects timing of a vertical synchronization signal in a video image signal obtained from the camera 9 (S401), and obtains an STC value when the encoder 31 detects the timing (S402). The encoder 31 receives the STC value at the timing of a vertical synchronization signal obtained by each of the encoders 33 to 37 (S403). The encoder 31 notifies the decoder 51 of the obtained STC values as the STC data 351 (S404). Moreover, the encoder 31 encodes a video image signal, and outputs, for example, the TS stream 350 and the STC data 351. Then, the encoder 31 returns to S411, and repeats the process.

Figure 13:
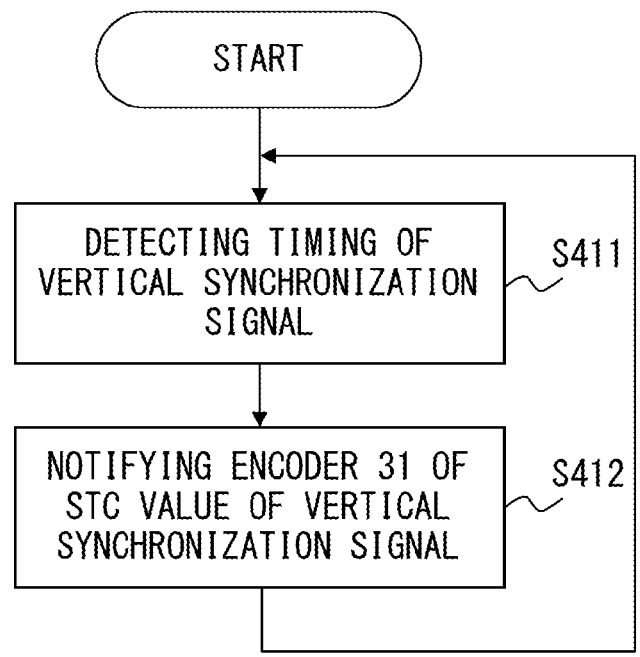
FIG. 13 is a flowchart illustrating operations of the encoder according to the first embodiment.

As illustrated in FIG. 13, the encoders 33 to 37 respectively detect the timing of the vertical synchronization signal (S411), notify the encoder 31 of the detected timing, encode the video image signal, and output, for example, the TS streams 360 to 380. Then, the encoders 33 to 37 return to S411, and repeat the process.

Figure 14:
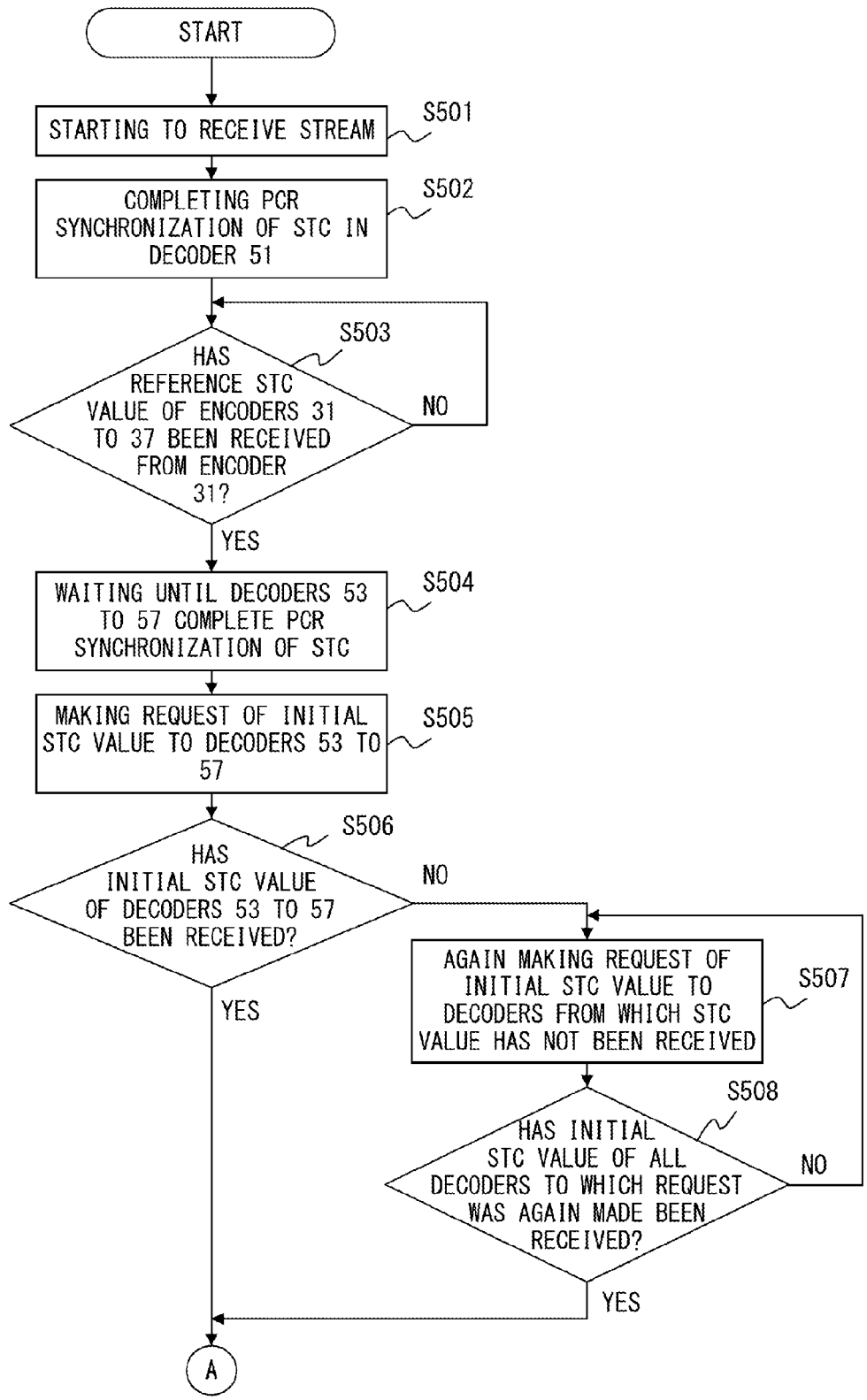
FIG. 14 is a flowchart illustrating operations of the decoder according to the first embodiment.
Figure 15:
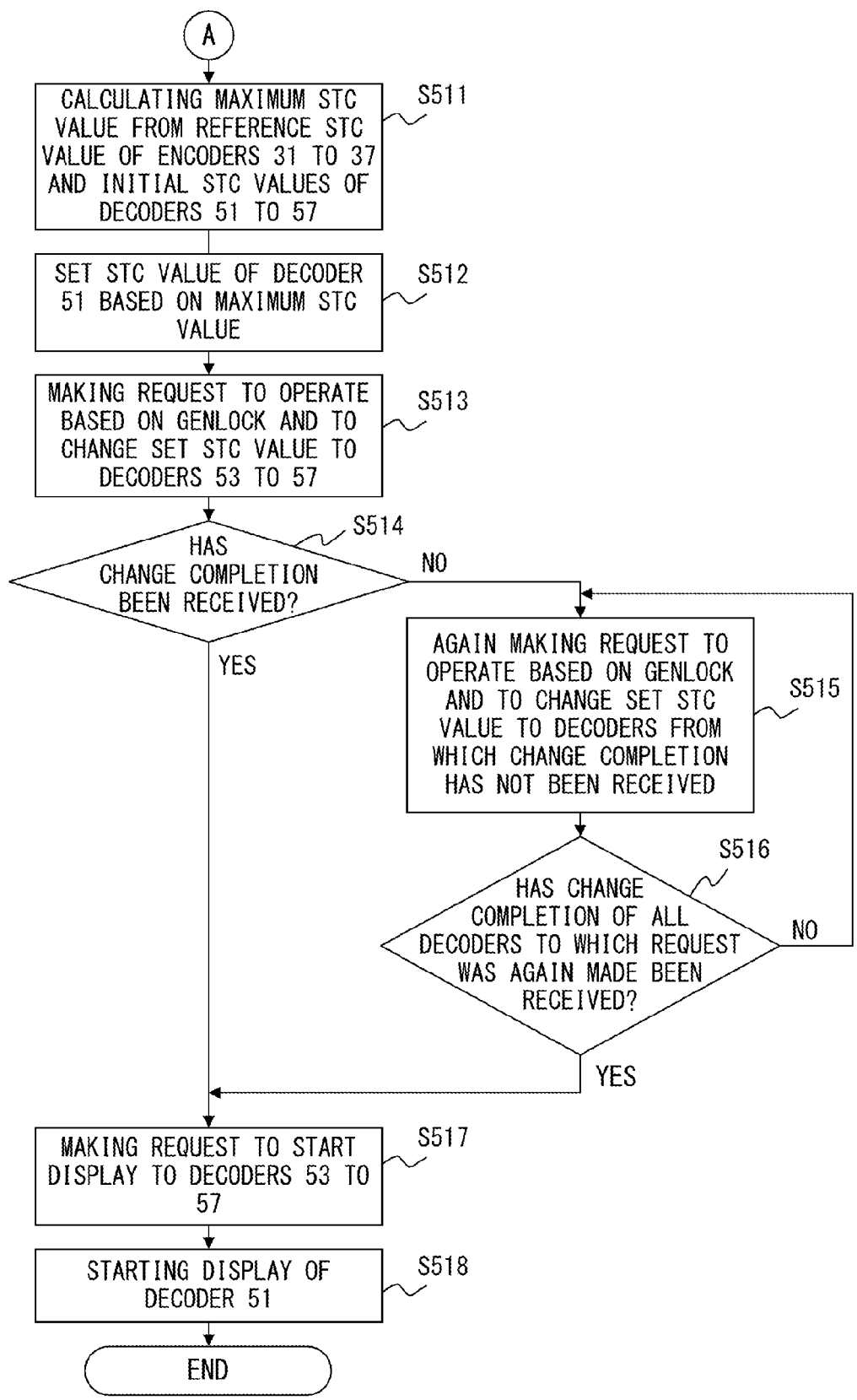
FIG. 15 is a flowchart illustrating operations of the decoder according to the first embodiment.
Figure 16:
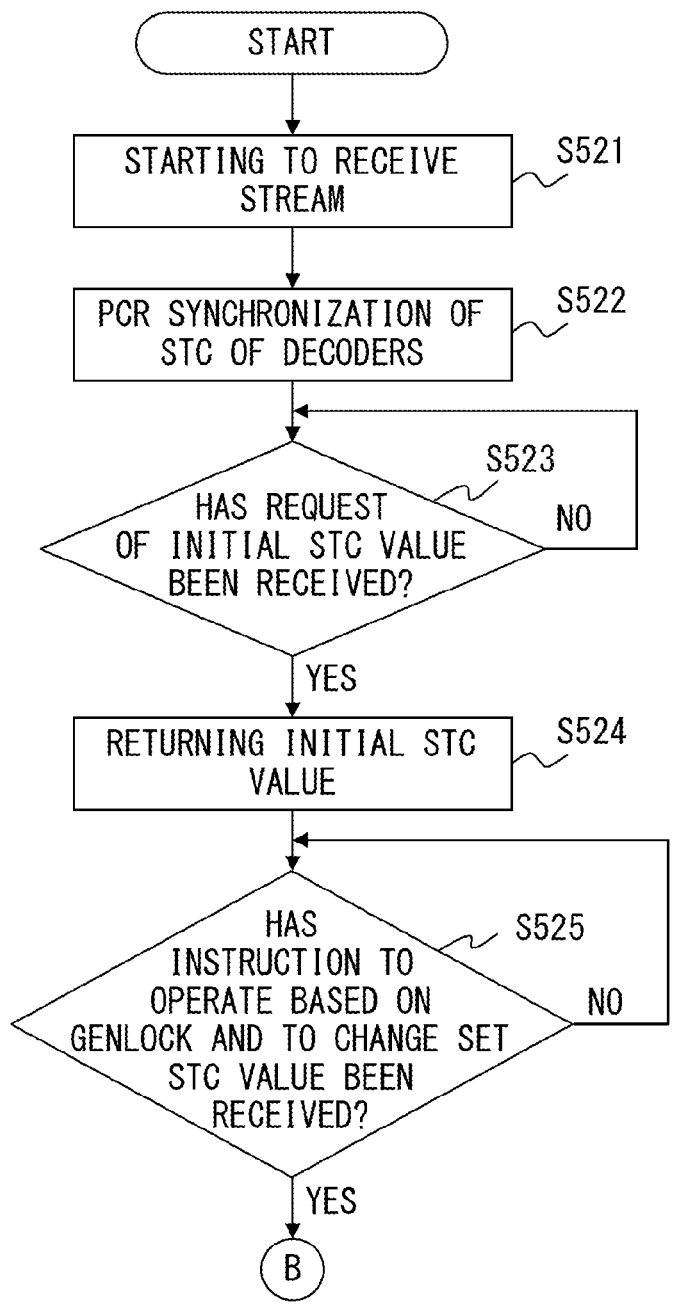
FIG. 16 is a flowchart illustrating operations of the decoder according to the first embodiment.
Figure 17:
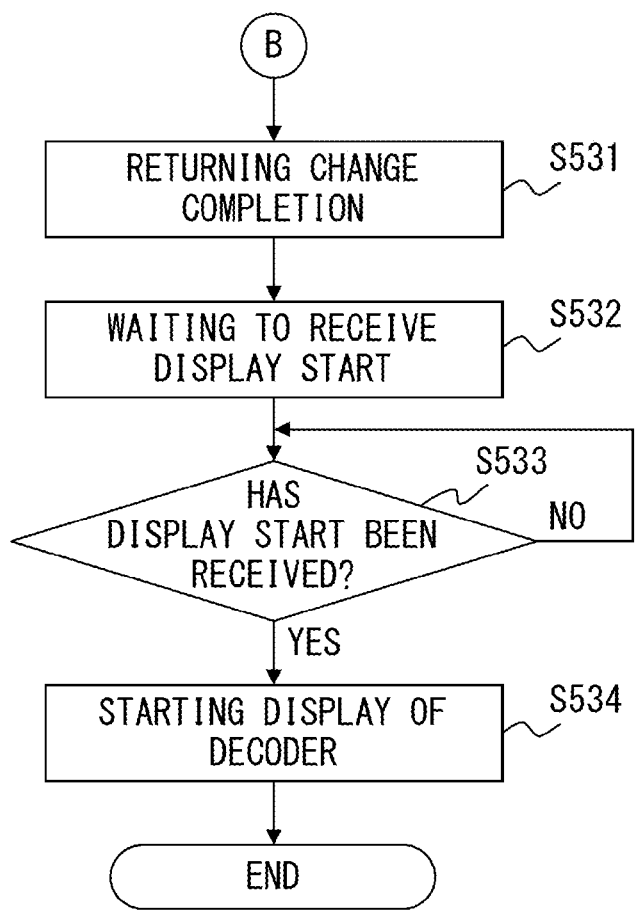
FIG. 17 is a flowchart illustrating operations of the decoder according to the first embodiment.

Playback start operations of the decoders 51 to 57 are described next. FIGS. 14 and 15 are flowcharts illustrating the playback start operations of the decoder 51. FIGS. 16 and 17 are flowcharts illustrating the playback start operations of the decoders 53 to 57.

As illustrated in FIG. 14, the reception unit 201 of the decoder 51 starts to receive, for example, the TS stream 350 (S501). The video image/audio demultiplexing unit 205 demultiplexes a video image, audio, and PCR from the TS stream 350 temporarily stored in the reception buffer unit 201. The PCR clock obtainment unit 215 obtains PCR from the video image/audio demultiplexing unit 205, and outputs the PCR to the STC clock generation unit 217. The STC clock generation unit 217 generates an STC block synchronous with the PCR (S502).

The decoder 51 repeatedly determines whether or not STC data has been obtained from the encoder 31 until the decoder 51 obtains the STC data ("NO" in S503). After the decoder 51 has obtained the STC data ("YES" in S503), the decoder 51 waits until the decoders 53 to 57 have similarly generated an STC clock synchronous with the PCR (S504).

The STC reading unit 225 of the decoder 51 obtains an STC value (initial STC value) of the next vertical synchronization signal of the local decoder, and makes a request of an initial STC value to each of the decoders 53 to 57 via the transmission unit 227 (S505). The decoder 51 determines whether or not the reception unit 201 have received the initial STC value, which is the STC value of the next vertical synchronization signal of each of the decoders 53 to 57, by the time the next vertical synchronization signal is obtained (S506). If the reception unit 201 has not received the initial STC value ("NO" in S506), the decoder 51 again makes a request of the initial STC value to the decoders 53 to 57 from which the initial STC value has not been received (S507). The decoder 51 determines whether or not the reception unit 201 has received the initial STC value from the decoders 53 to 57, to which the request was again made, by the time the next vertical synchronization signal is obtained (S508).

If the initial STC value the request of which is again made has not been received ("NO" in S508), the decoder 51 returns to S506, and repeats the process. If the initial STC value the request of which is again made has been received ("YES" in S508), the decoder 51 proceeds to the process of FIG. 15.

As illustrated in FIG. 15, the decoder 51 recognizes an initial STC value having a maximum difference between the initial STC value of each of the decoders 51 to 57 and the reference STC value as a maximum STC value in the STC calculation unit 221 (S511).

The decoder 51 sets the calculated maximum STC value as the STC value of the next vertical synchronization signal of the corresponding decoder via the STC setting unit 223 (S512). The decoder 51 calculates a set STC value of each of the other decoders by adding, to the maximum STC value, a value obtained by subtracting the reference STC value corresponding to the maximum STC value from each of the other reference STC values. The decoder 51 causes each of the decoders 53 to 57 to change the STC value by notifying each of the decoders 53 to 57 of the set STC value via the transmission unit 227. Moreover, the decoder 51 makes a request to cause the clock selection unit 239 to connect between the STC clock generation unit 241 and the GENLOCK clock generation unit 237 (S513). As a result, the decoders 53 to 57 operate based on the GENLOCK signal 231, and can synchronize the vertical synchronization signals and the STC clocks of the decoders 51 to 57.

The decoder 51 determines whether or not the set STC value has been set in each of the decoders 53 to 57 by the time of the STC value of the next vertical synchronization signal (S514). If the STC value has not been set ("NO" in S514), the decoder 51 makes a request to set the STC value of the next vertical synchronization signal to the decoders 53 to 57 that have not set the set STC value via the transmission unit 227. Moreover, the decoder 51 makes a request to cause the clock selection unit 239 to connect between the STC clock generation unit 241 and the GENLOCK clock generation unit 237 (S515) to the decoders 53 to 57 that have not set the STC value (S515). The decoder 51 determines whether or not all the decoders 53 to 57 complete the setting of the STC value, and switching of the clock selection unit 239 (S516). If all the decoders 53 to 57 do not complete the setting and the switching ("NO" in S516), the decoder 51 repeatedly makes the request of S515. If all the decoders 53 to 57 complete the setting and the switching, the decoder 51 makes a request to start displaying the partitioned video images 44 to 48 to the decoders 53 to 57 (S517). Moreover, the decoder 51 outputs the video image decoded by the video image decoding unit 207, and the audio decoded by the audio decoding unit 109 as the video image signal 235 via the video image display unit 211 and the audio display unit 213, and causes the display device 11 to start displaying the partitioned video image 42 (S518).

As illustrated in FIG. 16, the reception unit 201 of the decoders 53 to 57 starts to receive, for example, the TS streams 360 to 380 (S521). The video image/audio demultiplexing unit 205 demultiplexes a video image, audio, and PCR from the TS streams 360 to 380 temporarily stored in the reception buffer unit 203. The PCR clock obtainment unit 215 obtains PCR from the video image/audio demultiplexing unit 205. At this time, the clock selection unit 239 is in a state of connecting between the PCR clock obtainment unit 215 and the STC clock generation unit 241. Therefore, the STC clock generation unit 217 generates an STC clock synchronous with the PCR (S522).

The decoders 53 to 57 wait until the decoder 51 makes a request of the STC value (initial STC value) of the next vertical synchronization signal via the transmission unit 227 of the decoder 51 and the reception unit 201 of the decoders 53 to 57. The decoders 53 to 57 repeat the process of S523 if the request of the initial STC value has not been received ("NO" in S523).

If the request of the initial STC value has been received ("YES" in S523), the decoders 53 to 57 return the initial STC value read by the STC reading unit 247 to the decoder 51 (S524).

The decoders 53 to 57 wait until they receive the set STC value, and an instruction to operate based on the GENLOCK signal 231 via the transmission unit 227 of the decoder 51 and the reception unit 201 of the decoders 53 to 57 ("NO" in S525). When the decoders 53 to 57 receive the set STC value and the instruction to operate based on the GENLOCK signal 231, they proceed to the process of FIG. 17.

As illustrated in FIG. 17, the clock selection unit 239 connects between the GENLOCK clock generation unit 237 and the STC clock generation unit 241. Moreover, the STC clock generation unit 241 sets the STC value of the next vertical synchronization signal, which is notified to the vertical synchronization signal generation unit 243, and notifies the decoder 51 that the STC value has been changed via the transmission unit 249 (S531).

The decoders 53 to 57 wait until they receive an instruction to start displaying the partitioned video images 44 to 48 from the decoder 51 (S532). The decoders 53 to 57 repeatedly determines whether or not they have received the instruction ("NO" in S533) until they receive the instruction. Whey the decoders 53 to 57 have received the instruction ("YES" in S533), they output, as the video image signal 235, video image information decoded by the video image decoding unit 207, and audio information decoded by the audio decoding unit 209 via the video image display unit 211 and the audio display unit 213 of the respective decoders 53 to 57. As a result, the display device 11 is caused to display the partitioned video images 44 to 48 (S534).

As described above, with the video image transmission system 1 according to the first embodiment, the encoder 31 transmits STC data to the decoder 51. As a result, the decoder 51 obtains reference STC values of the encoders 31 to 37. Moreover, the decoder 51 obtains initial STC values from the decoders 53 to 57. The decoder 51 sets an initial STC value corresponding to a maximum value of a difference between the obtained initial STC value and reference STC value as a set STC value of a corresponding decoder. Moreover, the decoder 51 adds, to the set STC value corresponding to the maximum value, a value obtained by subtracting the initial STC value of each of the decoders 53 to 57 from the initial STC value corresponding to the above described maximum value, and sets the resultant value as the set STC value of each of the decoders 53 to 57.

As described above, the decoder 51 can calculate the set STC values, which have the same timing in the decoders 51 to 57, by taking into account a difference of STC values in the same vertical synchronization signal of the encoders 31 to 37, and a delay caused by the IP network. Namely, a plurality of partitioned video images are played back based on an initial STC value at which a real time according to an initial STC value of a plurality of pictures is later than that according to an initial STC value of the other pictures. At this time, the partitioned video images obtained by partitioning the original video image of one screen can be identified based on the STC data. Accordingly, with the video image transmission system 1, an original video image of one screen can be partitioned and transmitted via an IP network, and decoded and played back.

At this time, the encoders 33 to 37 do not need to match the PTS 353 added to the encoded picture 352 on the side of the encoding apparatus 3. Accordingly, only a unidirectional communication with which the encoders 33 to 37 notify the encoder 31 of a reference SIC value is sufficient, and a bidirectional communication for matching the PTS 353 among the encoders 31 to 37 is not needed.

(Second Embodiment) A video image transmission system 600 according to a second embodiment is described below with reference to the drawings. The same components and operations as those of the video image transmission system 1 according to the first embodiment are denoted with the same reference numerals, and their detailed descriptions are omitted.

Figure 18:
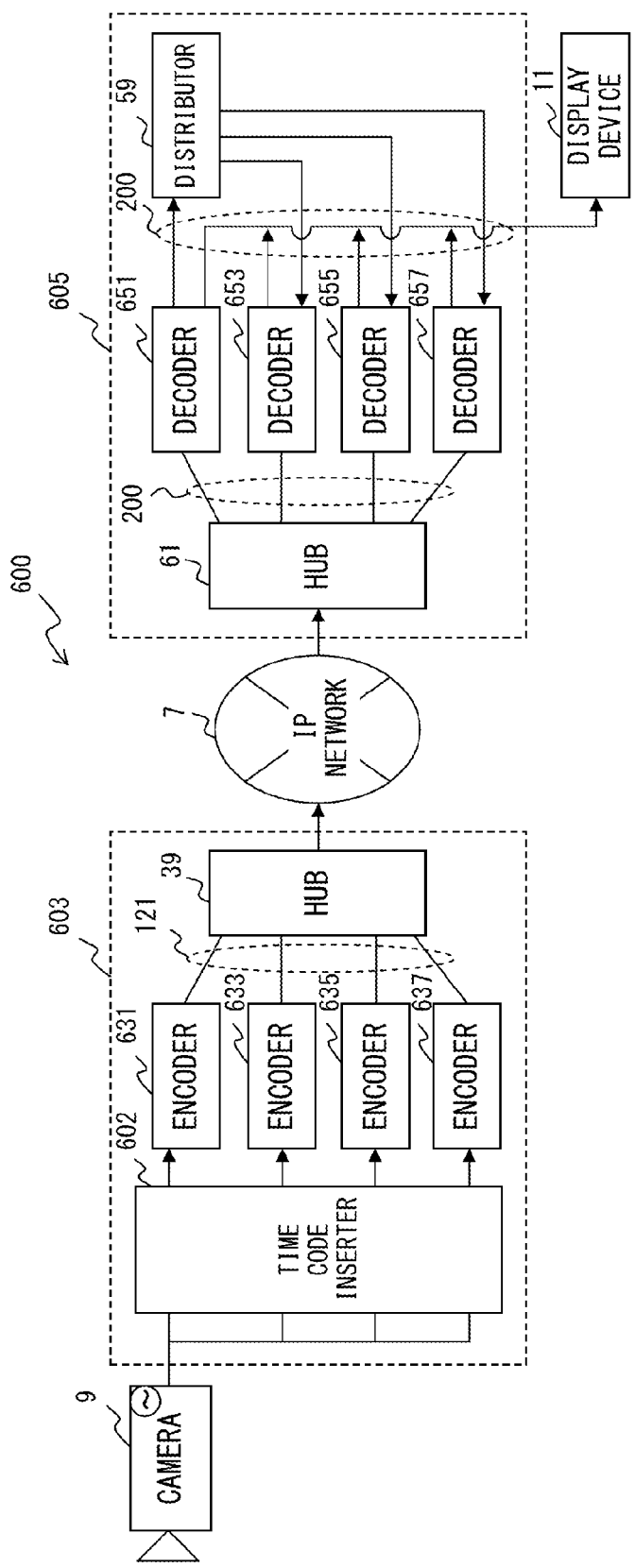
FIG. 18 illustrates a configuration of a video image transmission system according to a second embodiment.

FIG. 18 illustrates a configuration of the video image transmission system 600 according to the second embodiment. The video image transmission system 600 according to the second embodiment is a system where an encoding apparatus 603 to which the camera 9 is connected, and a decoding apparatus 605 to which the display device 11 is connected are connected via the IP network 7.

Similarly to the video image transmission system 1, the video image transmission system 600 is a system for partitioning and encoding a video image of one screen of an original video image, for transmitting the image in real time by using the IP network 7, and for synchronizing and playing back the image in the decoding apparatus.

The encoding apparatus 603 according to this embodiment includes a time code inserter 602, four encoders 631 to 637, and the HUB 39. Similarly to the encoders 31 to 37, the encoders 631 to 637 are encoders for respectively encoding a plurality of pictures included in four partitioned video images 22 to 28 into which the original video image 20 is partitioned, and for outputting the pictures as a stream. In this embodiment, the encoders 631 to 637 have the same configuration.

The time code inserter 602 is a device for inserting a time code in a video image signal. For example, in conformity with HD-SDI standard, a time code (Vertical Interval Time Code: VITC) can be transmitted as auxiliary data of a video image signal of HD-SDI scheme. In this embodiment, a VITC output function is used if the camera 9 has this function. If the camera 9 does not have this function, the time code inserter is provided at a stage preceding an HD-SDI input of the encoders 631 to 637 as illustrated in FIG. 18. The time code inserter 602 obtains and outputs, for example, a time synchronous with a specified signal such as a black burst signal or the like of the original video image 20.

The decoding apparatus 605 according to this embodiment includes four decoders 651 to 657, the distributor 59, and the HUB 61. As illustrated in FIG. 18, the decoding apparatus 605 is a decoding apparatus for decoding information that is encoded by the encoding apparatus 603 and transmitted via the IP network 7, and for playing back the playback video image 40 by displaying the partitioned video images 42 to 48. The decoders 653 to 657 have the same configuration.

Hardware configurations of the encoders 631 to 637 and the decoders 651 to 657 according to the second embodiment can be implemented, for example, as the same configurations as those of the encoders 31 to 37 and the decoders 51 to 57 according to the first embodiment.

Figure 19:
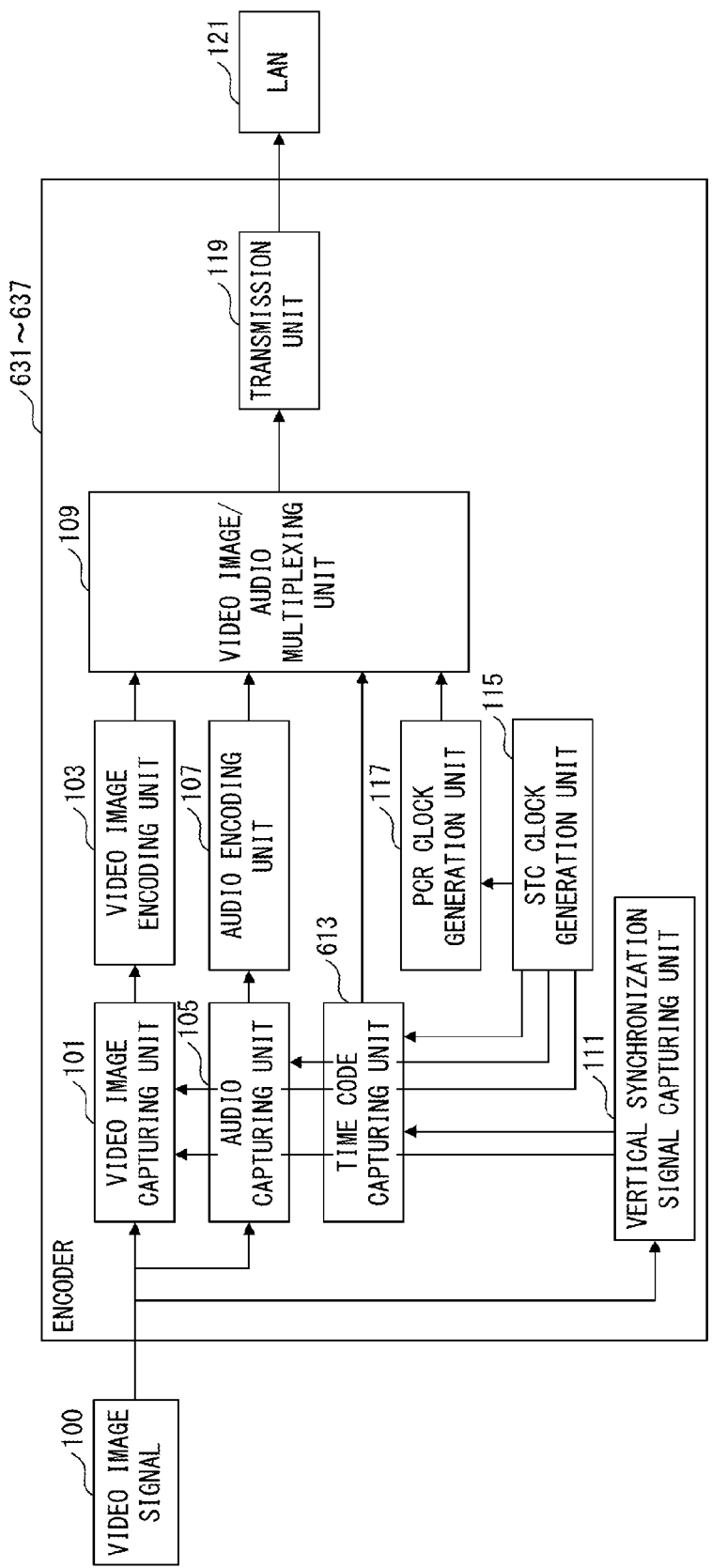
FIG. 19 illustrates one example of functional blocks of an encoder according to the second embodiment.

FIG. 19 is a block diagram illustrating functions of the encoders 631 to 637. As illustrated in FIG. 19, the encoders 631 to 637 have the functions of the video image capturing unit 101, the video image encoding unit 103, the audio capturing unit 105, the audio encoding unit 107, and the video image/audio multiplexing unit 109 similarly to the encoder 31. The encoders 631 to 637 also have the functions of the vertical synchronization signal capturing unit 111, the STC clock generation unit 115, the PCR clock generation unit 117, the transmission unit 119, the STC data generation unit 123, and the reception unit 125. The encoders 631 to 637 further include a time code capturing unit 613.

The time code capturing unit 613 reads a time of timing according to a specified signal from a video image signal of HD-SDI scheme output from the camera 9, and outputs the read time to the video image/audio multiplexing unit 109. The read time is multiplexed with the encoded picture 352 and the like, and transmitted as a time code along with the PTS value. The time code will be described later. In this embodiment, the encoders 631 to 637 do not communicate with one another.

The encoders 631 to 637 are configured as described above, so that streams based on the original video image 20, which are transmitted via the IP network 7, result in four separate streams obtained by respectively encoding, for example, the partitioned video images 22 to 28. As described above, the encoders 631 to 637 multiplex encoded video images, audio, and generated PCR, and respectively output a TS stream including a time code and encoded pictures in time series.

Figure 20:
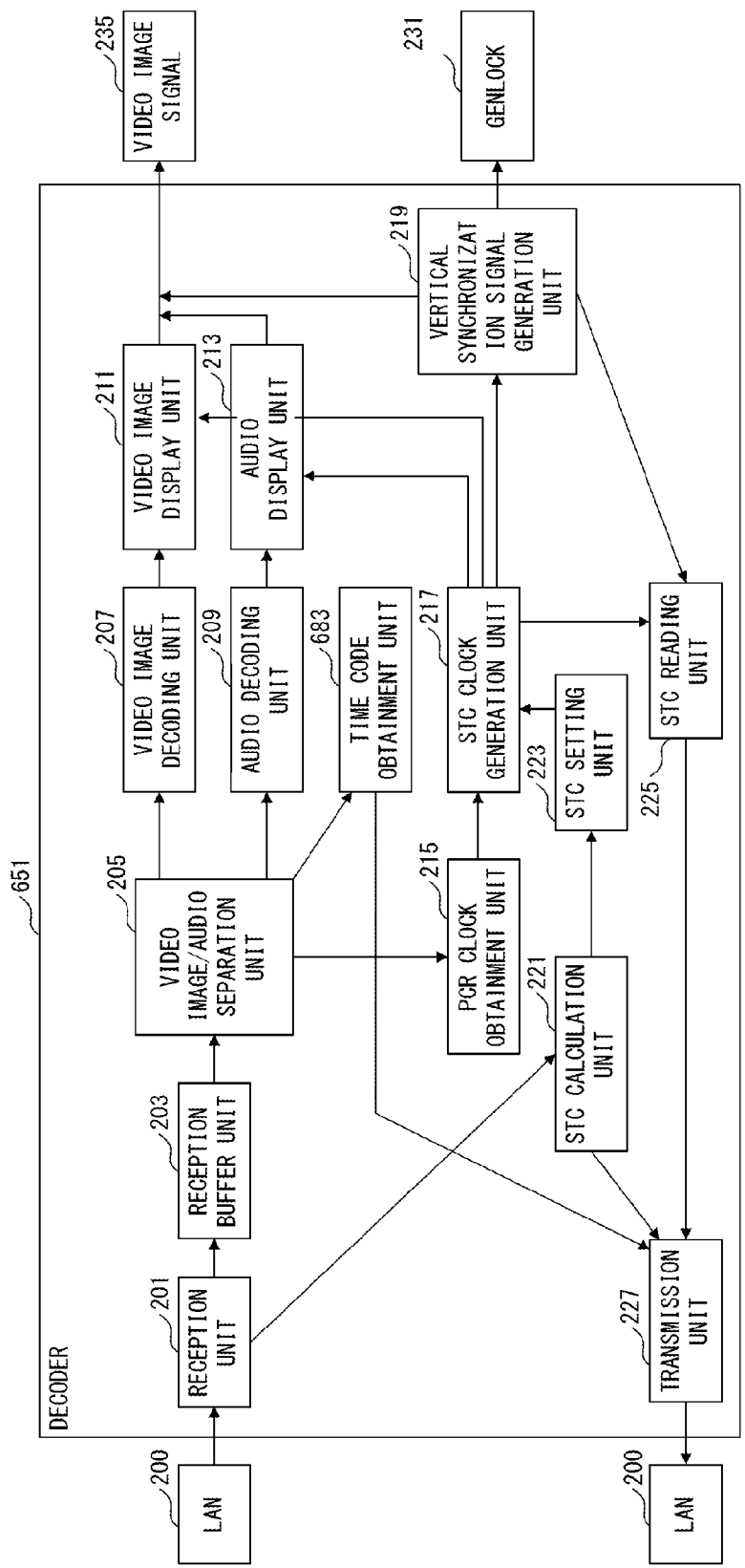
FIG. 20 illustrates one example of functional blocks of a decoder according to the second embodiment.

The functions of the decoders 651 to 657 according to this embodiment are described next with reference to FIGS. 20 and 21. FIG. 20 is a block diagram illustrating the functions of the decoder 651, whereas FIG. 21 is a block diagram illustrating the functions of the decoders 653 to 657. Since the TS streams of the four encoders 631 to 637 are transmitted as the separate TS streams in this embodiment as described above, the individual streams arrive at the decoders at different times. Accordingly, when the decoding apparatus 605 simply plays back the TS streams received by the decoders 651 to 657 without synchronizing them, different video images respectively for the partitioned screens are played back. Accordingly, the decoders 651 to 657 are configured, for example, as follows.

As illustrated in FIG. 20, the decoder 651 includes the functions of the reception unit 201, the reception buffer unit 203, the video image/audio demultiplexing unit 205, the video image decoding unit 207, the audio decoding unit 209, the video image display unit 211, and the audio display unit 213. The decoder 651 also has the functions of the PCR clock obtainment unit 215, the STC clock generation unit 217, the vertical synchronization signal generation unit 219, the STC calculation unit 221, the SIC setting unit 223, the STC reading unit 225, and the transmission unit 227.

The decoder 651 further includes a time code obtainment unit 683. The time code obtainment unit 683 is provided on an output side of the video image/audio demultiplexing unit 205, and extracts a time code from information of a video image portion. Moreover, the time code obtainment unit 683 makes, to the decoders 653 to 657, a request to transmit a PTS value corresponding to the same time code data as the time code data included in the obtained time code, and an STC value corresponding to a picture next to the corresponding picture.

In the first embodiment, the decoder 51 calculates a reference STC value based on STC data. In the second embodiment, the decoder 651 calculates a reference STC value by using a PTS value included in a time code. The calculated reference STC value may be a PTS value itself, or a value relative to one of values corresponding to partitioned video images obtained by partitioning a captured image of one screen as a reference value.

In the decoder 651, the reception unit 201 receives PTS values of the decoders 653 to 657, which are included in the time code 640 or the like and correspond to the same time code. Moreover, the reception unit 201 receives initial STC values of a picture next to the picture corresponding to time code data in the decoders 653 to 657.

The STC reading unit 225 reads the initial STC value corresponding to the picture next to the picture corresponding to the time code data. The STC calculation unit 221 sets the PTS value included in the time code of the local decoder obtained by the time code obtainment unit 683 as a reference STC value. Moreover, the STC calculation unit 221 extracts a maximum STC value, which is a difference between the reference STC value of each of the decoders 651 to 657 and the initial STC value corresponding to the next picture.

The STC calculation unit 221 sets the obtained maximum SIC value as the set SIC value of timing of the vertical synchronization signal of the next picture in the corresponding decoder. Moreover, the STC calculation unit 221 calculates a set STC value set in the other decoders by adding, to the maximum STC value, a value obtained by subtracting the reference STC value corresponding to the obtained maximum STC value from each of the other reference STC values.

The STC calculation unit 221 outputs the calculated set STC value corresponding to the decoder 651 to the STC setting unit 223. Moreover, the STC calculation unit 221 notifies each of the decoders 653 to 657 of the calculated set STC value corresponding to each of the decoders 653 to 657 via the transmission unit 227. The STC setting unit 223 notifies the STC clock generation unit 217 of the calculated STC value. As a result, video image information and audio information are output as the video image signal 235 according to the vertical synchronization signal output from the vertical synchronization signal generation unit 219, and the display device 11 is caused to display the partitioned image 42.

The functions of the decoders 653 to 657 are described below with reference to FIG. 21. As illustrated in FIG. 21, the decoders 653 to 657 include the reception unit 201, the reception buffer unit 201, the video image/audio demultiplexing unit 205, the video image decoding unit 207, the audio decoding unit 209, the video image display unit 211, and the audio display unit 213 similarly to the decoder 651.

Moreover, the decoders 653 to 657 include the PCR clock obtainment unit 215, the GENLOCK clock generation unit 237, the clock selection unit 239, the STC clock generation unit 241, the vertical synchronization signal generation unit 243, the STC setting unit 245, the STC reading unit 247, and the transmission unit 249.

The decoders 653 to 657 further include the time code obtainment unit 683. The time code obtainment unit 683 is provided on the output side of the video image/audio demultiplexing unit 205, and extracts a time code from video image information. Moreover, the time code obtainment unit 683 transmits a PTS value that is requested by the decoder 651 and corresponds to each of the partitioned video images 24 to 28 including the time code, and the STC value of the next picture, which is read by the STC reading unit 225, to the decoder 651 via the transmission unit 249.

Thus configured decoders 653 to 657 output the video image signal 235 based on the STC value set in the decoder 651, and the vertical synchronization signal, and cause the display device 11 to display the partitioned video images 44 to 48.

FIG. 22 conceptually illustrates a picture transmission according to the second embodiment. FIG. 22 conceptually illustrates the TS streams 350, 360, 370, and 380 (collectively referred to as TS streams 350 to 380) generated by the above described encoders 631 to 637. Moreover, FIG. 22 conceptually illustrates time code data 640, 660, 662, and 664 (hereinafter referred to collectively as the time code data 640 or the like).

As illustrated in FIG. 22, the encoders 631 to 637 generate the TS streams 350 to 380 by encoding video image signals of partitioned video images obtained from the camera 9. At this time, for example, the time code data 646 includes the PTS value 642 and the time code 644. The PTS value 642 is the same information as the PTS value of a corresponding encoded picture. The time code 644 can be defined as information indicating a time, for example, according to Black Burst signal of the video image signal output from the camera 9. Note that the time code 644 has the same value for encoded pictures of the same screen.

When the TS streams 350 to 380 are transmitted via the IP network 7, delay times caused by the transmissions are not uniform. Therefore, times when the TS streams arrive at the decoders 651 to 657 are different. Therefore, the partitioned video images 22 to 28 into which the same original video image 20 is partitioned are identified based on the time code 644, and a reference STC value is calculated based on the PTS value 642 corresponding to the identified encoded picture 352. In this embodiment, the PTS value can be defined as a reference STC value. A process for obtaining an initial STC value and adjusting a set STC value is the same as that of the first embodiment.

Operations of the video image transmission system 600 configured as described above are described with reference to a flowchart. FIG. 23 is the flowchart illustrating the operations of the encoders 631 to 637. In this embodiment, the encoders 631 to 637 have the same configuration and operations. In this embodiment, the encoding apparatus 603 generates time code data 640 and the like as a replacement for the STC data in the first embodiment, and transmits the generated data to the decoding apparatus 605. The rest of the operations of the encoders 631 to 637 according to the second embodiment is the same as the operations of the encoder 31 according to the first embodiment.

As illustrated in FIG. 23, the encoders 631 to 637 obtain the PTS value 642, the time code 644 and the like based on the time code data 640 and the like with the time code capturing unit 613 (S691). The video image capturing unit 101 obtains a PTS value at timing of a vertical synchronization signal (S692). The video image/audio multiplexing unit 109 outputs the time code data 640, and the TS stream 350 including the PTS values (S693).

Figure 24:
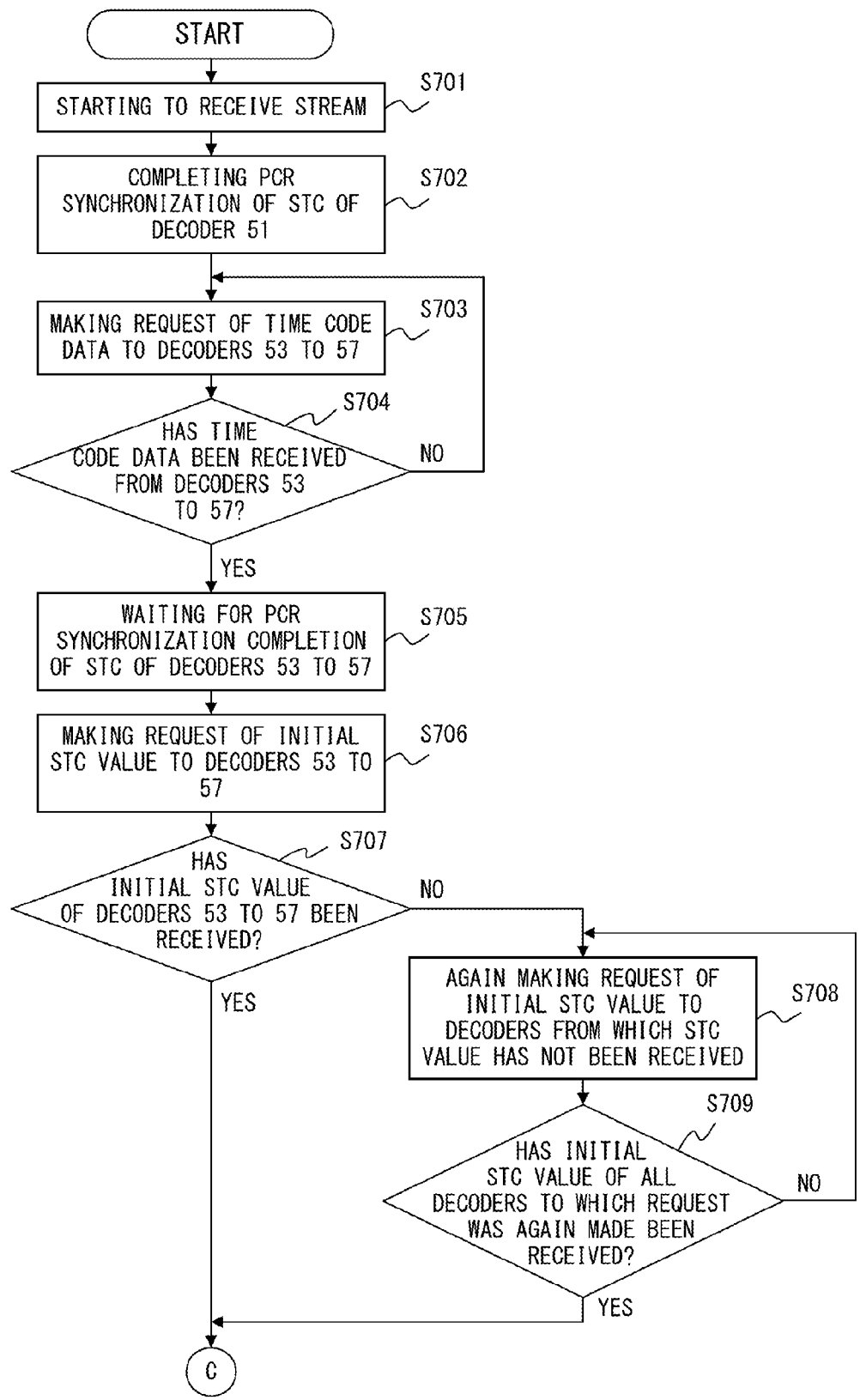
FIG. 24 is a flowchart illustrating operations of the decoder according to the second embodiment.
Figure 25:
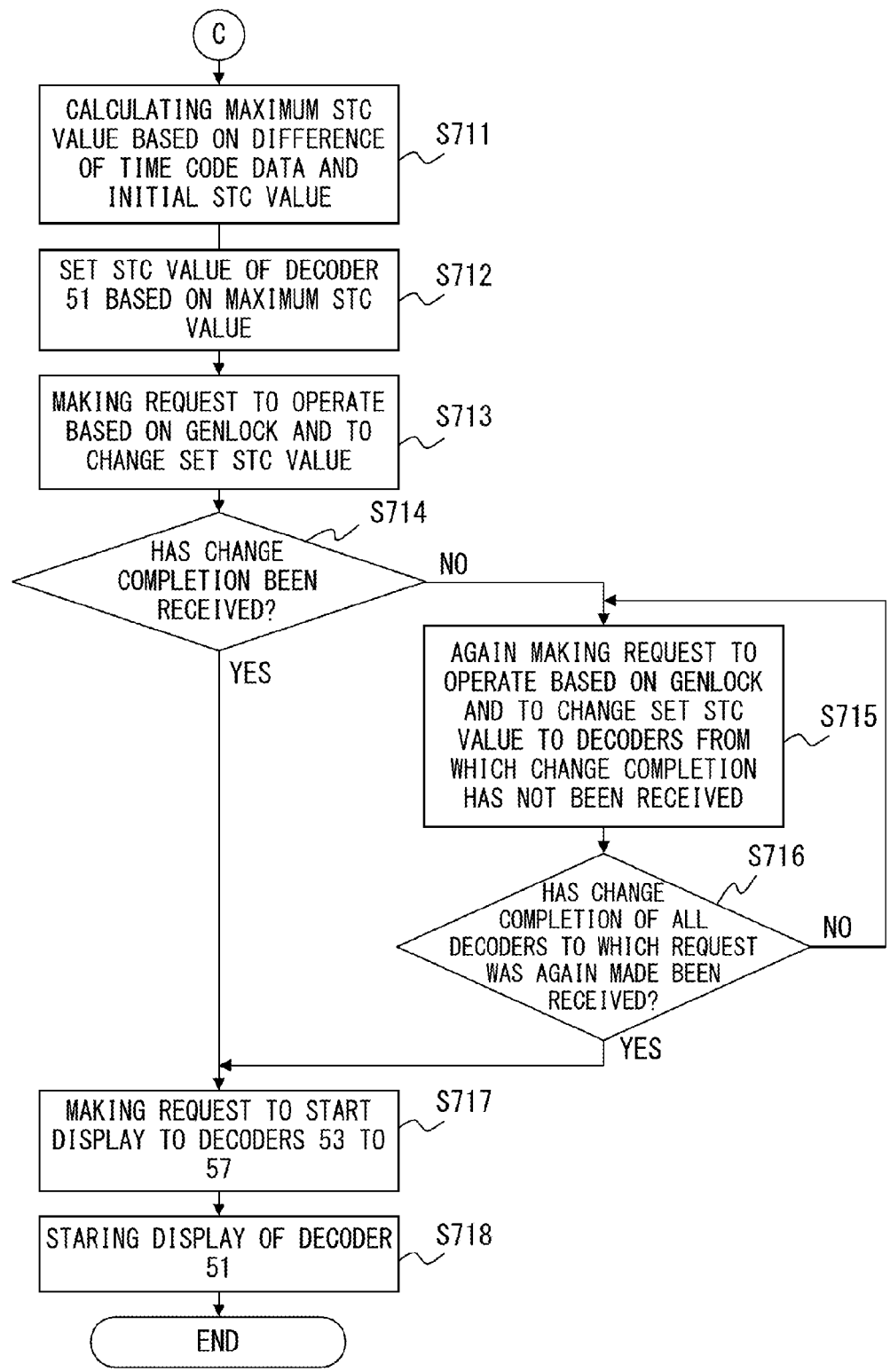
FIG. 25 is a flowchart illustrating operations of the decoder according to the second embodiment.
Figure 26:
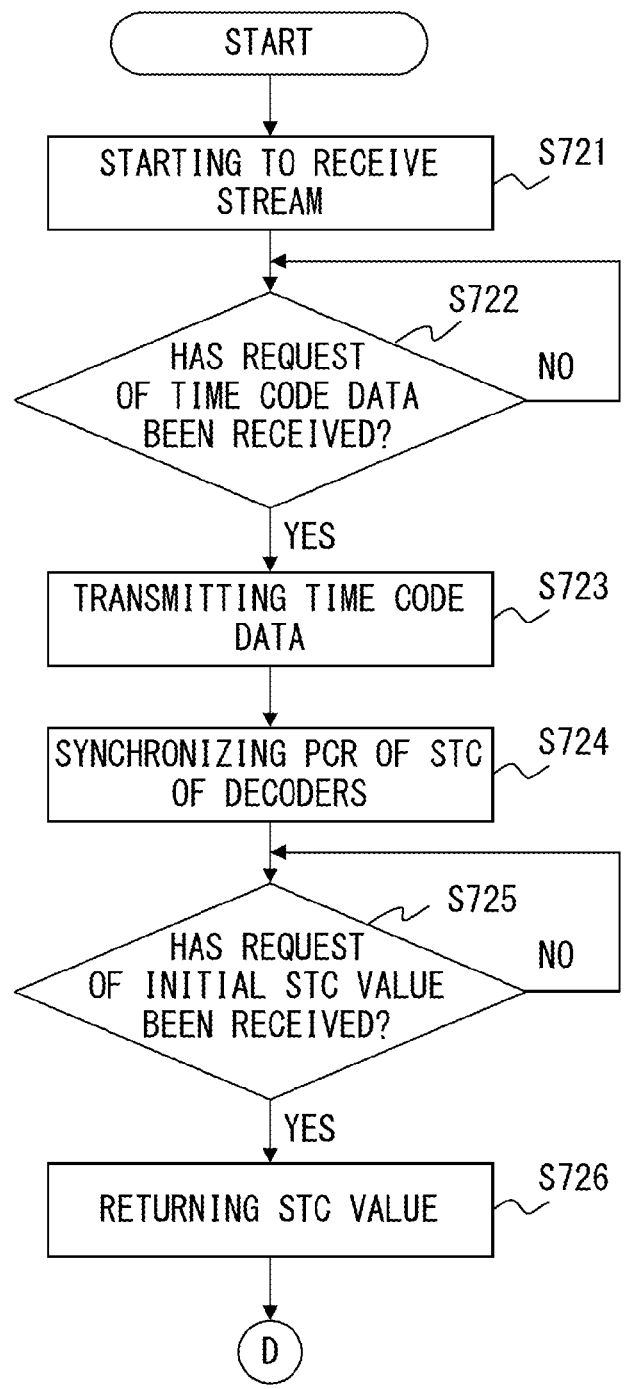
FIG. 26 is a flowchart illustrating operations of the decoder according to the second embodiment.
Figure 27:
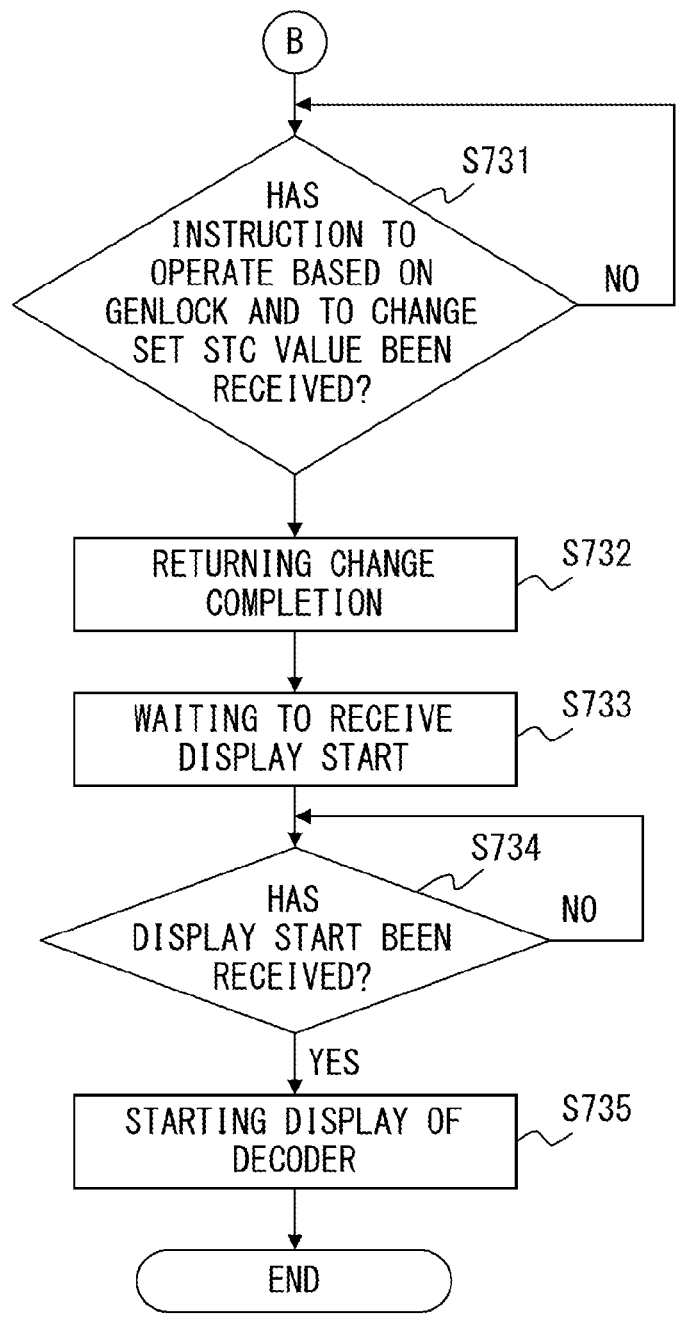
FIG. 27 is a flowchart illustrating operations of the decoder according to the second embodiment.

Operations of the decoding apparatus 605 according to this embodiment are described next with reference to FIGS. 24 to 27. FIGS. 24 and 25 are flowcharts illustrating the operations of the decoder 651. FIGS. 26 and 27 are flowcharts illustrating the operations of the decoders 653 to 657.

As illustrated in FIG. 24, the reception unit 201 of the decoder 651 starts to receive, for example, the TS stream 350 (S701). The video image/audio demultiplexing unit 205 demultiplexes a video image, audio, and PCR from the TS stream 350 temporarily stored in the reception buffer unit 203. The PCR clock obtainment unit 215 obtains the PCR from the video image/audio demultiplexing unit 205, and outputs the obtained PCR to the STC clock generation unit 217. The STC clock generation unit 217 generates an STC clock synchronous with the PCR (S702).

The decoder 651 obtains the time code data 640 and the like of the local decoder, and makes a request of the time code data 640 and the like to the decoders 653 to 657 (S703). The decoder 651 determines whether or not it has obtained the time code data 640 and the like from the decoders 653 to 657 (S704). If the decoder 651 has not obtained the time code data 640 and the like ("NO" in S704), it returns to S703. When the decoder 651 has obtained the time code data 640 and the like ("YES" in S704), it waits until the decoders 653 to 657 similarly complete the generation of an STC clock synchronous with the PCR (S705).

The decoder 651 obtains an STC value (initial STC value) of the next vertical synchronization signal of the local decoder, and makes a request of an STC value of the next vertical synchronization signal to each of the decoders 653 to 657 via the transmission unit 227 (S706). The decoder 651 determines whether or not the initial STC value, which is the STC value of the next vertical synchronization signal of the decoders 653 to 657, has been received by the reception unit 201 by the time the next vertical synchronization signal is obtained (S707). If the initial SIC value has not been received ("NO" in S707), the decoder 651 again makes a request of the initial STC value, to the decoders 653 to 657 from which the initial STC value has not been received (S708). The decoder 651 determines whether or not the initial STC value from the decoders 653 to 657 to which the request was again made has been received by the reception unit 201 by the time the next vertical synchronization signal is obtained (S709).

If the initial STC value the request of which was again made has not been received ("NO" in S709), the decoder 651 returns to S708, and repeats the process. When the initial STC value the request of which was again made has been received ("YES" in S708), the decoder 651 proceeds to the process of FIG. 25.

As illustrated in FIG. 25, the decoder 651 recognizes, as a maximum STC value, an initial SIC value having a maximum difference between the initial STC value of each of the decoders 651 to 657 and the reference STC value in the STC calculation unit 221 (S711). As the reference STC value, a difference between PTS values is also available.

The decoder 651 sets the calculated maximum STC value as the STC value of the next vertical synchronization signal of a corresponding decoder via the STC setting unit 223 (S712). The decoder 651 calculates the set STC value of each of the other decoders by adding, to the maximum SIC value, a value obtained by subtracting the reference STC value corresponding to the maximum STC value from each of the other reference STC values. The decoder 651 causes the decoders 653 to 657 to change the SIC value by notifying each of the decoders 653 to 657 of the set STC value via the transmission unit 227. Moreover, the decoder 651 makes a request to cause the clock selection unit 239 to connect between the STC clock generation unit 241 and the GENLOCK clock generation unit 237 (S713). As a result, the decoders 653 to 657 operate based on the GENLOCK signal 231, so that vertical synchronization signals and STC clocks of the decoders 651 to 657 can be synchronized with one another.

The decoder 651 determines whether or not the set STC value has been set in each of the decoders 653 to 657 by the time of the STC value of the next vertical synchronization signal (S714). If the STC value has not been set ("NO" in S714), the decoder 651 makes a request to set the STC value of the next vertical synchronization signal to the decoders 653 to 657, in which the set STC value has not been set, via the transmission unit 227. Moreover, the decoder 651 makes a request to cause the clock selection unit 239 to connect between the SIC clock generation unit 241 and the GENLOCK clock generation unit 237 to the decoders 653 to 657 in which the set STC value has not been set (S715). The decoder 651 determines whether or not all the decoders 653 to 657 have set the STC value and have caused the clock selection unit 239 to switch between the STC clock generation unit 241 and the GENLOCK clock generation unit 237 (S716). If any of the decoders 653 to 657 has not set the STC value and had not caused the clock selection unit 239 to switch between the STC clock generation unit 241 and the GENLOCK clock generation unit 237 ("NO" in S716), the decoder 651 repeatedly makes the request of S715. If all the decoders 653 to 657 have set the STC value and caused the clock selection unit 239 to switch between the SIC clock generation unit 241 and the GENLOCK clock generation unit 237 ("YES" in S716), the decoder 651 makes a request to start displaying the partitioned video images 44 to 48 to the decoders 653 to 657 (S717). Moreover, the decoder 651 outputs the video image decoded by the video image decoding unit 207, and audio decoded by the audio decoding unit 209 as the video image signal 235 via the video image display unit 211 and the audio display unit 213, and causes the display device 11 to display the partitioned video image 42 (S718).

As illustrated in FIG. 26, the reception unit 201 of the decoders 653 to 657 starts to respectively receive, for example, the TS streams 360 to 380 (S721). The decoders 653 to 657 repeatedly determine whether or not a request of time code data has been received from the decoder 651 until they receive the request ("NO" in S722). When the decoders 653 to 657 have received the request ("YES" in S722), they notify the decoder 651 of the time code data (S723).

The video image/audio demultiplexing unit 205 demultiplexes a video image, audio, and PCR from each of the TS streams 360 to 380 temporarily stored in the reception buffer unit 203. The PCR clock obtainment unit 215 obtains the PCR from the video image/audio demultiplexing unit 205. At this time, the clock selection unit 239 is in a state of connecting between the PCR clock obtainment unit 215 and the STC clock generation unit 241. Therefore, the STC clock generation unit 217 generates an STC clock synchronous with the PCR (S724).

The decoders 653 to 657 wait until the decoder 651 makes a request of the STC value (initial STC value) of the next vertical synchronization signal via the transmission unit 227 of the decoder 651 and the reception unit 201 of the decoders 653 to 657. If the request of the initial STC value has not been received ("NO" in S725), the decoders 653 to 657 repeat the process of S725.

When the request of the initial STC value has been received ("YES" in S725), the decoders 653 to 657 return the initial STC value, which is read and calculated by the STC reading unit 247, to the decoder 651 (S726).

Then, the decoders 653 to 657 wait until they receive, from the decoder 651, a set STC value and an instruction to operate based on the GENLOCK signal 231 via the transmission unit 227 of the decoder 651 and the reception unit 201 of the decoders 653 to 657 as illustrated in FIG. 27 ("NO" in S731). When the decoders 653 to 657 have received the set STC value and the instruction to operate based on the GENLOCK signal 231 ("YES" in S731), they proceed to S732. The clock selection unit 239 connects between the GENLOCK clock generation unit 237 and the STC clock generation unit 241. Moreover, the STC clock generation unit 241 sets the STC value of the next vertical synchronization signal, which is notified to the vertical synchronization signal generation unit 243, and notifies the decoder 651 via the transmission unit 249 that the STC value has been changed (S732).

The decoders 653 to 657 wait until an instruction to start displaying the partitioned video images 44 to 48 is received from the decoder 651 (S733). The decoders 653 to 657 repeatedly determine whether or not the instruction has been received until they receive the instruction ("NO" in S734). When the decoders 653 to 657 have received the instruction ("YES" in S734), they output video image information decoded by the video image decoding unit 207, and audio information decoded by the audio decoding unit 209 as the video image signal 235 via the video image display unit 211 and the audio display unit 213 of the decoders 653 to 657. Then, the decoders 653 to 657 cause the display device 11 to display the partitioned video images 44 to 48 (S735).

As described above, with the video image transmission system 600 according to the second embodiment, the encoders 631 to 637 transmit the time code data 640 and the like to the decoders 651 to 657. At this time, which of the decoders 651 to 657 receives a stream transmitted from which of the encoders 631 to 637 is not limited. The decoder 651 obtains a PTS value of time code data including the same time code 644 from the other decoders 653 to 657, and calculates a reference STC value of the encoders 631 to 637. Moreover, the decoder 651 obtains an initial STC value from each of the decoders 653 to 657. The decoder 651 recognizes an initial STC value corresponding to a maximum value of a difference between the obtained initial STC value and a reference STC value as a set STC value of a corresponding decoder. Moreover, the decoder 651 adds, to the set STC value corresponding to the maximum value, a value obtained by subtracting the initial STC value of each of the decoders 653 to 657 from the initial STC value corresponding to the maximum value, and sets the resultant value as the set STC value of each of the decoders 653 to 657.

As described above, the decoder 651 can take into account a difference among STC values in the same vertical synchronization signal of the encoders 631 to 637 and a delay caused by an IP network, and calculate set STC values with which timings of the decoders 651 to 657 are synchronized with one another. At this time, a plurality of pictures into which an original video image of one screen is partitioned can be identified based on the time code data 640. Accordingly, with the video image transmission system 600, an original video image of one screen can be partitioned and transmitted via an IP network, and decoded and played back.

At this time, the side of the encoding apparatus 603 does not need to synchronize PTS 353 added to the encoded picture 352 in the encoders 631 to 637. Moreover, since the time code data 640 and the like are added to each encoded picture, the encoders 631 to 637 do not need to communicate with one another. Accordingly, the amount of information processing executed by the encoding apparatus 603 is not increased by communications performed among the encoders 631 to 637.

With the encoding apparatus, decoding apparatus, encoding method, decoding method, and program according to the above described embodiments, synchronized partitioned video images can be transmitted in a cost-effective IP network without needing devices such as a conversion device.

In the above described first and second embodiments, the encoder 31 is one example of the encoder or the master encoder, and the encoders 33 to 37 are one example of the encoder or the slave encoder. The decoder 51 or 651 is one example of the decoder or the master decoder, and the decoders 53 to 57 and 653 to 657 are examples of the decoder or the slave decoder.

The video image capturing unit 101 is one example of the image input unit, the STC data generation unit 123 is one example of the time information obtainment unit, and the video image/audio multiplexing unit 109 is one example of the encoding unit. The STC reading unit 113 is one example of the time information obtainment/transmission unit. The reception unit 201 is one example of the encoded information obtainment unit. The STC reading unit 225 is one example of the master playback time calculation unit. The STC calculation unit 221 is one example of the playback time setting unit. The transmission unit 227 is one example of the playback time notification unit. The video image display unit 211 and the audio display unit 213 are examples of the playback unit.

The STC setting unit 245 is one example of the slave playback time setting unit. The STC reading unit 247 is one example of the slave playback time calculation unit. The transmission unit 249 is one example of the playback time notification unit. The time code obtainment unit 683 is one example of the identification information obtainment unit. Moreover, the reference STC value and the PTC value are examples of time information. The STC data 305 and the time code data 640 are examples of identification information. The initial STC value is one example of playback scheduled time, master playback time, and slave playback time. The set STC value is one example of the playback time. The original video image 20 is one example of a video image.

The present invention is not limited to the above described embodiments. Various configuration or embodiments can be adopted within a scope that does not depart from the gist of the present invention. For example, the set STC value calculation method is not limited to the above described one. In the first embodiment, a maximum value of a difference between an initial STC value and a reference STC value is obtained. However, for example, another calculation method with which the same result can be obtained, such as a method for setting any of reference STC values as a reference value, and for obtaining a maximum value of a difference between the reference value and a corresponding initial STC value may be used.

The encoders 31 to 37, the decoders 51 to 57, the encoders 631 to 637, and the decoders 651 to 6657 can be implemented with a computer having a standard configuration.

Here, an example of a computer applied in common in order to cause the computer to perform encoding or decoding operations according to the above described first or second embodiment is described.

Figure 28:
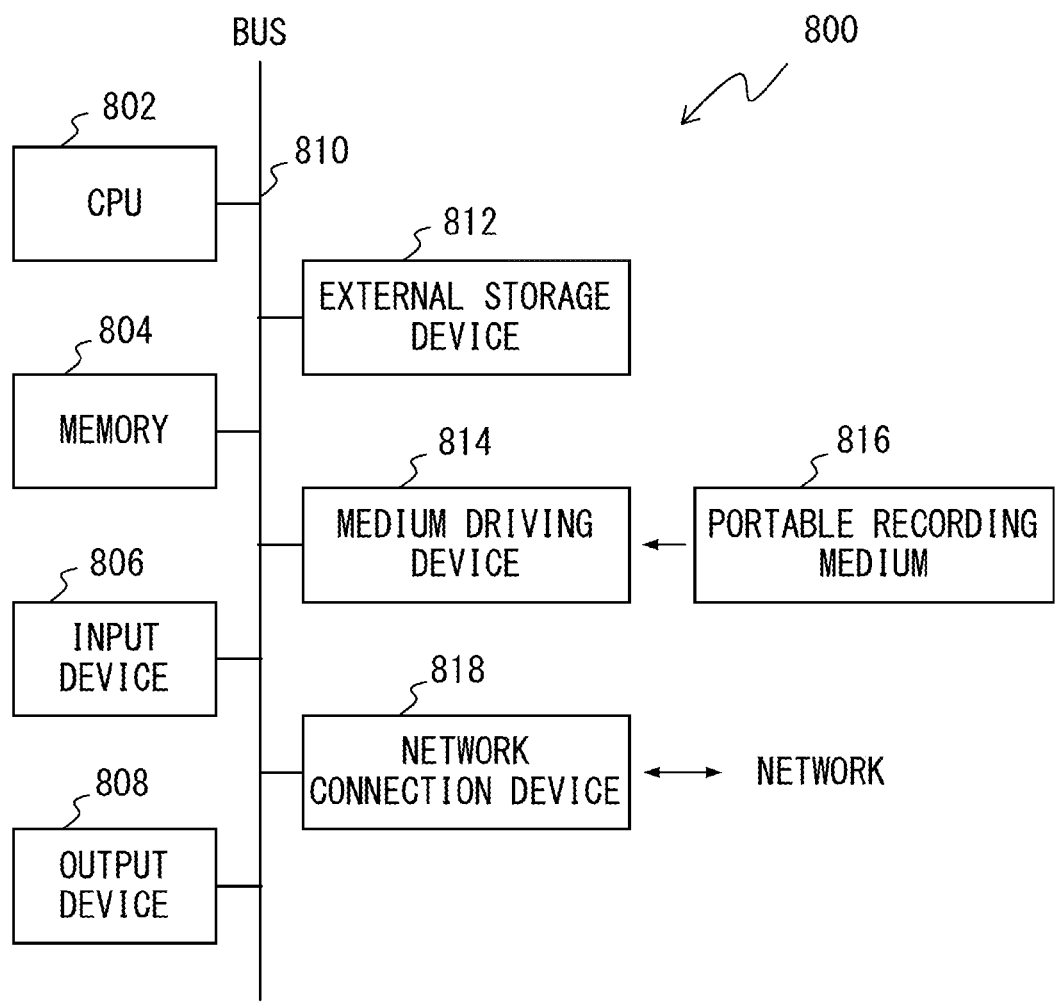
FIG. 28 is a block diagram illustrating one example of a hardware configuration of a standard computer.

FIG. 28 is a block diagram illustrating one example of a hardware configuration of the standard computer. As illustrated in FIG. 28, the computer 800 includes a CPU 802, a memory 804, an input device 806, an output device 808, an external storage device 812, a medium driving device 814, a network connection device and the like, which are interconnected via a bus 810.

The CPU 802 is a central processing unit for controlling operations of the entire computer 800. The memory 804 is a storage unit for storing in advance a program for controlling the operations of the computer 800, or used as a working area as needed when the program is executed. The memory 804 is, for example, Random Access Memory (RAM), Read Only Memory (ROM), or the like. The input device 806 is a device for obtaining an input of various items of information, which is made by a user of the computer 800 and associated with content of an operation, when the user performs the operation on the input device 806, and for transmitting the obtained input information to the CPU 802. The input device 806 is, for example, a keyboard device, a mouse device or the like. The output device 808 is a device for outputting a result of a process executed by the computer 800, and includes a display device and the like. The display device displays, for example, a text or an image according to display data transmitted from the CPU 802.

The external storage device 812 is a storage device such as a hard disk or the like, and is a device for storing various types of control programs executed by the CPU 802, obtained data an the like. The medium driving device 814 is a device for writing and reading to and from a portable recording medium 816. The CPU 802 can also execute various types of control processes by reading and executing a specified control program recorded on the portable recording medium 816 via the medium driving device 814. The portable recording medium 816 is, for example, Compact Disc (CD)-ROM, Digital Versatile Disc (DVD), Universal Serial Bus (USB) memory or the like. The network connection device 818 is an interface device for managing transmissions and receptions of various types of data to and from an outside wiredly or wirelessly. The bus 810 is a communication path for interconnecting the above described devices and the like, and for exchanging data.

A program for causing the computer to perform the encoding or the decoding according to the above described first or second embodiment is stored, for example, in the external storage device 812. The CPU 802 reads the program from the external storage device 812, and causes the computer 800 to perform the encoding or decoding operations. At this time, a control program for causing the CPU 802 to execute the encoding or decoding process is created and prestored in the external storage device 812. Then, a specified instruction is given from the input device 806 to the CPU 802, so that this control program is read and executed from the external storage device 812. Alternatively, this program may be stored on the portable recording medium 816.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An encoding apparatus comprising
one master encoder and at least one slave encoder, wherein:
the master encoder is input one partitioned image among a plurality of partitioned images obtained by partitioning each of captured images in time series,
obtains time information corresponding to the input one partitioned image, and from the slave encoder, time information respectively corresponding to remaining images other than the one partitioned image among the plurality of partitioned images,
generates first encoded information including an encoded image obtained by encoding the one partitioned image, and identification information including the time information respectively corresponding to the plurality of partitioned images, and
transmits the first encoded information in time series; and
the slave encoder is input the remaining images other than the one partitioned image among the plurality of partitioned images in time series,
transmits time information corresponding to the remaining images other than the one partitioned image to the master encoder,
generates second encoded information including encoded images, which are obtained by encoding the remaining images other than the one partitioned image, and the time information corresponding to the remaining images other than the one partitioned image, and
transmits the second encoded information in time series.

2. The encoding apparatus according to claim 1, wherein the transmission of the first encoded information and the transmission of the second encoded information are performed via an Internet Protocol network.

3. The encoding apparatus according to claim 2, wherein the master encoder further obtains a time at which a specified signal obtained by partitioning each of the captured images is obtained, and
the identification information includes the obtained time at which the specified signal is obtained.

4. A decoding apparatus comprising
a master decoder and at least one slave decoder, wherein:
the master decoder obtains, in time series, encoded information including an encoded image, which is obtained by encoding one partitioned image among a plurality of partitioned images obtained by partitioning each of captured images, and identification information including a plurality of time information respectively corresponding to the plurality of partitioned images,
calculates a master playback time scheduled to play back a next image next to the one partitioned image based on the time information,
identifies and obtains, from the at least one slave decoder, a slave playback time scheduled to play back an image next to one of remaining images other than the one partitioned image among the plurality of partitioned images based on the time information,
respectively calculates a plurality of playback times for playing back a plurality of next partitioned images next to the plurality of partitioned images based on a maximum value of a difference between the master playback time or the slave playback time and the respectively corresponding time information, and a difference between the time information corresponding to the maximum value and the respectively corresponding time information other than the time information corresponding to the maximum value,
sets the calculated playback time of the master decoder as a playback time for playing back the next image next to the one partitioned image,
notifies the at least one slave decoder of the calculated playback time, and
plays back the one partitioned image obtained by decoding the encoded image based on the set playback time; and
the slave decoder obtains, in time series, encoded information including an encoded image obtained by encoding a different partitioned image other than the one partitioned image decoded by the master decoder among the plurality of partitioned images, and time information corresponding to the different partitioned image,
calculates a slave playback time scheduled to play back an image next to the different partitioned image corresponding to the time information obtained in the slave decoder,
notifies the master decoder of the slave playback time,
obtains the playback time of the next image from the master decoder, and
plays back the different partitioned image obtained by decoding the encoded image based on the playback time.

5. A decoding apparatus comprising
a mater decoder and at least one slave decoder, wherein:
the master decoder obtains, in time series, encoded information including an encoded image, which is obtained by encoding one partitioned image among a plurality of partitioned images obtained by partitioning each of captured images, time information corresponding to the one partitioned image, and identification information including a time obtained before the encoding based on a specified signal obtained by partitioning each of the captured images,
obtains the identification information from the encoded information,
calculates a master playback time scheduled to play back a next image next to the one partitioned image based on the time information,
obtains, from the at least one slave decoder, the time information of a different partitioned image other than the one image partitioned among the plurality of partitioned images, and a salve playback time for playing back an image next to the different partitioned image based on the identification information, and respectively calculates a plurality of playback times for playing back a plurality of next partitioned images next to the plurality of partitioned images based on a maximum value of a difference between the master playback time or the at least one slave playback time and the respectively corresponding time information, and a difference between the time information corresponding to the maximum value and the respectively corresponding time information other than the time information corresponding to the maximum value,
sets the calculated playback time of the master decoder as a playback time for playing back the next image,
notifies the at least one slave decoder of the calculated playback time, and plays back the one partitioned image obtained by decoding the encoded image based on the set playback time; and the slave decoder obtains, in time series, encoded information including an encoded image obtained by encoding the different partitioned image other than the one partitioned image decoded by the master decoder among the plurality of partitioned images, time information corresponding to the encoded image, and the identification information including the time obtained before the encoding based on a specified signal included in each of the captured images, obtains the identification information from the encoded information, calculates a slave playback time scheduled to play back an image next to the different partitioned image corresponding to the time information obtained in the slave decoder, notifies the master decoder of the slave playback time and the time information, obtains a playback time of the next image from the master decoder, and plays back the different partitioned image obtained by decoding the encoded image based on the playback time.

6. An encoding method for respectively encoding a plurality of partitioned images obtained by partitioning each of captured images, the method being performed by one master encoder and at least one slave encoder, the method comprising:

obtaining, by the master encoder to which one partitioned image among the plurality of partitioned images obtained by partitioning each of the captured images is input in time series, time information corresponding to the input one partitioned image;

obtaining, by the master encoder, time information respectively corresponding to remaining images other than the one partitioned image among the plurality of partitioned images from the slave encoder;

generating, by the master encoder, first encoded information including the encoded image, which is obtained by encoding the one partitioned image, and identification information including time information respectively corresponding to the plurality of partitioned images obtained by partitioning each of the captured images;

transmitting, by the master encoder, the first encoded information in time series;

transmitting, by the slave encoder to which the remaining images other than the one partitioned image among the plurality of partitioned images is input in time series, time information corresponding to the remaining images other than the one partitioned image to the master encoder;

generating, by the slave encoder, second encoded information including encoded images, which are obtained by encoding the remaining images other than the one partitioned image, and the time information corresponding to the remaining images other than the one partitioned image; and transmitting, by the slave encoder, the second encoded information in time series.

7. The encoding method according to claim 6, wherein the transmission of the first encoded information and the transmission of the second encoded information are performed via an Internet Protocol network.

8. The encoding method according to claim 6, further comprising obtaining, by the master encoder, a time at which a specified signal obtained by partitioning each of the captured images is obtained, wherein the identification information includes the obtained time at which the specified signal is obtained.

9. A decoding method for decoding a plurality of encoded images of a plurality of partitioned images obtained by partitioning each of captured images, the method being performed by a master decoder and at least one slave decoder, the method comprising:

obtaining, by the master decoder in time series, encoded information including an encoded image, which is obtained by encoding one partitioned image among the plurality of partitioned images obtained by partitioning each of the captured images, and identification information including a plurality of time information respectively corresponding to the plurality of partitioned images;

calculating, by the master decoder, a master playback time scheduled to play back a next image next to the one partitioned image based on the time information;

identifying and obtaining, by the master decoder, a slave playback time scheduled to play back an image next to one of remaining images other than the one partitioned image among the plurality of partitioned images from the at least one slave decoder based on the time information;

respectively calculating, by the master decoder, a plurality of playback times for playing back a plurality of next partitioned images next to the plurality of partitioned images based on a maximum value of a difference between the master playback time or the slave playback time and the respectively corresponding time information, and a difference between the time information corresponding to the maximum value and the respectively corresponding time information other than the time information corresponding to the maximum value;

setting, by the master decoder, the calculated playback time of the master decoder as a playback time for playing back the next image next to the one partitioned image;

notifying, by the master decoder, the at least one slave decoder of the calculated playback time;

playing back, by the master decoder, the one partitioned image obtained by decoding the encoded image based on the set playback time;

obtaining, by the slave decoder in time series, encoded information including an encoded image obtained by encoding a different partitioned image other than the one partitioned image decoded by the master decoder among the plurality of partitioned images, and time information corresponding to the different partitioned image;

calculating, by the slave decoder, a slave playback time scheduled to play back an image next to the different partitioned image corresponding to the time information obtained by the slave decoder;

notifying, by the slave decoder, the master decoder of the slave playback time;

obtaining, by the slave decoder, the playback time of the next image from the master decoder; and playing back, by the slave decoder, the different partitioned image obtained by decoding the encoded image based on the playback time.

10. A decoding method for decoding a plurality of encoded images of a plurality of partitioned images obtained by partitioning each of captured images, the method being performed by a master decoder and at least one slave decoder, the method comprising:
- obtaining, by the master decoder in time series, encoded information including an encoded image, which is obtained by encoding one partitioned image among the plurality of partitioned images obtained by partitioning each of the captured images, time information corresponding to the one partitioned image, and identification information including a time obtained before the encoding based on a specified signal obtained by partitioning each of the captured images;
- obtaining, by the master decoder, the identification information from the encoded information;
- calculating, by the master decoder, a master playback time scheduled to play back a next image next to the one partitioned image based on the time information;
- obtaining, by the master decoder, from the at least one slave decoder the time information of a different partitioned image other than the one partitioned image among the plurality of partitioned images, and a slave playback time for playing back an image next to the different partitioned image based on the identification information;
- respectively calculating, by the master decoder, a plurality of playback times for playing back a plurality of next partitioned images next to the plurality of partitioned images based on a maximum value of a difference between the master playback time or the at least one slave playback time and the respectively corresponding time information, and a difference between the time information corresponding to the maximum value and the respectively corresponding time information other than the time information corresponding to the maximum value;
- setting, by the master decoder, the calculated playback time of the master decoder as a playback time for playing back the next image;
- notifying, by the master decoder, the at least one slave decoder of the calculated playback time;
- playing back, by the master decoder, the one partitioned image obtained by decoding the encoded image based on the set playback time;
- obtaining, by the slave decoder in time series, encoded information including an encoded image obtained by encoding the different partitioned image other than the one partitioned image decoded by the master decoder among the plurality of partitioned images, time information corresponding to the encoded image, and the identification information including the time obtained before the encoding based on a specified signal included in each of the captured images;
- obtaining, by the slave decoder, the identification information from the encoded information;
- calculating, by the slave decoder, a slave playback time scheduled to play back an image next to the different partitioned image corresponding to the time information obtained by the slave decoder;
- notifying, by the slave decoder, the master decoder of the slave playback time and the time information;
- obtaining, by the slave decoder, a playback time of the next image from the master decoder; and
- playing back, by the slave decoder, the different partitioned image obtained by decoding the encoded image based on the playback time.

11. A non-transitory computer-readable recording medium having stored therein a program for causing a computer to execute, as an encoding apparatus which includes one master encoder and at least one slave encoder, a process for respectively encoding a plurality of partitioned images obtained by partitioning each of captured images, the process comprising:
- obtaining, as the master encoder to which one partitioned image among the plurality of partitioned images obtained by partitioning each of the captured images is input in time series, time information corresponding to the input one partitioned image;
- obtaining, as the master encoder, time information respectively corresponding to remaining images other than the one partitioned image among the plurality of partitioned images from the slave encoder;
- generating, as the master encoder, first encoded information including the encoded image, which is obtained by encoding the one partitioned image, and identification information including time information respectively corresponding to the plurality of partitioned images obtained by partitioning each of the captured images;
- transmitting, as the master encoder, the first encoded information in time series;
- transmitting, as the slave encoder to which the remaining images other than the one partitioned image among the plurality of partitioned images is input in time series, time information corresponding to the remaining images other than the one partitioned image to the master encoder;
- generating, as the slave encoder, second encoded information including encoded images, which are obtained by encoding the remaining images other than the one partitioned image, and the time information corresponding to the remaining images other than the one partitioned image; and
- transmitting, as the slave encoder, the second encoded information in time series.

12. The recording medium according to claim 11, wherein the transmission of the first encoded information and the transmission of the second encoded information are performed via an Internet Protocol network.

13. A non-transitory recording medium having stored therein a program for causing a computer to execute, as a decoding apparatus which includes a master decoder and at least one slave decoder, a process for decoding a plurality of encoded images of a plurality of partitioned images obtained by partitioning each of captured images, the process comprising:
- obtaining, as the master decoder in time series, encoded information including an encoded image, which is obtained by encoding one partitioned image among the plurality of partitioned images obtained by partitioning each of the captured images, and identification information including a plurality of time information respectively corresponding to the plurality of partitioned images;
- calculating, as the master decoder, a master playback time scheduled to play back a next image next to the one partitioned image based on the time information;
- identifying and obtaining, as the master decoder, a slave playback time scheduled to play back an image next to one of remaining images other than the one partitioned image among the plurality of partitioned images from the at least one slave decoder based on the time information;

respectively calculating, as the master decoder, a plurality of playback times for playing back a plurality of next partitioned images next to the plurality of partitioned images based on a maximum value of a difference between the master playback time or the slave playback time and the respectively corresponding time information, and a difference between the time information corresponding to the maximum value and the respectively corresponding time information other than the time information corresponding to the maximum value;

setting, as the master decoder, the calculated playback time of the master decoder as a playback time for playing back the next image next to the one partitioned image;

notifying, as the master decoder, the at least one slave decoder of the calculated playback time;

playing back, as the master decoder, the one partitioned image obtained by decoding the encoded image based on the set playback time;

obtaining, as the slave decoder in time series, encoded information including an encoded image obtained by encoding a different partitioned image other than the one partitioned image decoded by the master decoder among the plurality of partitioned images, and time information corresponding to the different partitioned image;

calculating, as the slave decoder, a slave playback time scheduled to play back an image next to the different partitioned image corresponding to the time information obtained by the slave decoder;

notifying, as the slave decoder, the master decoder of the slave playback time;

obtaining, as the slave decoder, the playback time of the next image from the master decoder; and playing back, as the slave decoder, the different partitioned image obtained by decoding the encoded image based on the playback time.

14. A non-transitory recording medium having stored therein a program for causing a computer to execute, as a decoding apparatus which includes a master decoder and at least one slave decoder, a process for decoding a plurality of encoded images of a plurality of partitioned images obtained by partitioning each of captured image images, the process comprising:

obtaining, as the master decoder in time series, encoded information including an encoded image, which is obtained by encoding one partitioned image among the plurality of partitioned images obtained by partitioning each of the captured images, time information corresponding to the one partitioned image, and identification information including a time obtained before the encoding based on a specified signal obtained by partitioning each of the captured images;

obtaining, as the master decoder, the identification information from the encoded information;

calculating, as the master decoder, a master playback time scheduled to play back a next image next to the one partitioned image based on the time information;

obtaining, as the master decoder, from the at least one slave decoder the time information of a different partitioned image other than the one partitioned image among the plurality of partitioned images, and a slave playback time for playing back an image next to the different partitioned image based on the identification information;

respectively calculating, as the master decoder, a plurality of playback times for playing back a plurality of next partitioned images next to the plurality of partitioned images based on a maximum value of a difference between the master playback time or the at least one slave playback time and the respectively corresponding time information, and a difference between the time information corresponding to the maximum value and the respectively corresponding time information other than the time information corresponding to the maximum value;

setting, as the master decoder, the calculated playback time of the master decoder as a playback time for playing back the next image;

notifying, as the master decoder, the at least one slave decoder of the calculated playback time;

playing back, as the master decoder, the one partitioned image obtained by decoding the encoded image based on the set playback time;

obtaining, as the slave decoder in time series, encoded information including an encoded image obtained by encoding the different partitioned image other than the one partitioned image decoded by the master decoder among the plurality of partitioned images, time information corresponding to the encoded image, and the identification information including the time obtained before the encoding based on a specified signal included in each of the captured images;

obtaining, as the slave decoder, the identification information from the encoded information;

calculating, as the slave decoder, a slave playback time scheduled to play back an image next to the different partitioned image corresponding to the time information obtained by the slave decoder;

notifying, as the slave decoder, the master decoder of the slave playback time and the time information;

obtaining, as the slave decoder, a playback time of the next image from the master decoder; and playing back, as the slave decoder, the different partitioned image obtained by decoding the encoded image based on the playback time.

* * * * *